(12) United States Patent
Reijersen Van Buuren et al.

(10) Patent No.: US 9,232,697 B2
(45) Date of Patent: Jan. 12, 2016

(54) BALE FORMING APPARATUS AND METHOD WITH A REAR HOUSING PART PIVOTAL ABOUT AT LEAST 90 DEGREES

(71) Applicant: FORAGE INNOVATIONS B.V., Maassluis (NL)

(72) Inventors: Willem Jacobus Reijersen Van Buuren, Maassluis (NL); Rudy De Jong, Maassluis (NL)

(73) Assignee: FORAGE INNOVATIONS B.V., Maassluis (NL)

( * ) Notice: Subject to any disclaimer, the term of this patent is extended or adjusted under 35 U.S.C. 154(b) by 0 days.

(21) Appl. No.: 14/395,763

(22) PCT Filed: Apr. 19, 2013

(86) PCT No.: PCT/NL2013/050291
§ 371 (c)(1),
(2) Date: Oct. 20, 2014

(87) PCT Pub. No.: WO2013/157951
PCT Pub. Date: Oct. 24, 2013

(65) Prior Publication Data
US 2015/0128551 A1    May 14, 2015

(30) Foreign Application Priority Data

Apr. 20, 2012  (NL) .................................. 2008667
Apr. 20, 2012  (NL) .................................. 2008668

(51) Int. Cl.
*A01F 15/08*  (2006.01)
*A01F 15/07*  (2006.01)

(52) U.S. Cl.
CPC ........... *A01F 15/0705* (2013.01); *A01F 15/071* (2013.01); *A01F 15/0883* (2013.01); *A01F 2015/074* (2013.01); *A01F 2015/078* (2013.01); *A01F 2015/0735* (2013.01)

(58) Field of Classification Search
CPC .............. A01F 15/071; A01F 15/0883; A01F 15/0705; A01F 2015/0735; A01F 2015/074; A01F 2015/075
USPC .............................. 100/40, 76, 87, 88; 56/341
See application file for complete search history.

(56) References Cited

U.S. PATENT DOCUMENTS

| 4,114,530 | A  | * | 9/1978 | Miller ............................. 100/87 |
| 4,597,254 | A  |   | 7/1986 | Bowden, Jr. |
| 6,321,507 | B1 | * | 11/2001 | Copeland et al. ................ 53/118 |
| 2002/0078674 | A1 | * | 6/2002 | Lucand et al. ................... 56/341 |
| 2012/0204738 | A1 |   | 8/2012 | Reijersen Van Buuren |

FOREIGN PATENT DOCUMENTS

| EP | 0 672 340 A1 | 9/1995 |
| GB | 2 111 903 A | 7/1983 |
| WO | WO 2011/053120 A1 | 5/2011 |

* cited by examiner

*Primary Examiner* — Jimmy T Nguyen
(74) *Attorney, Agent, or Firm* — Birch, Stewart, Kolasch & Birch, LLP

(57) ABSTRACT

A bale forming apparatus and a bale forming method for forming cylindrical bales of material are provided. An intake device conveys material through an outlet into a bale forming chamber which is surrounded by a bale forming mechanism and which is situated adjacent to the outlet. A front housing part and a rear housing part are adapted for being connected with each other to form a bale forming housing. The rear housing part together with a bale on a bale carrying member can be pivoted with respect to the front housing part around an angle of at least 90 degrees. The rear housing part can be pivoted from a bale receiving position into a bale ejecting position where the bale is ejected.

15 Claims, 15 Drawing Sheets

BALE FORMING APPARATUS AND METHOD WITH A REAR HOUSING PART PIVOTAL ABOUT AT LEAST 90 DEGREES

BACKGROUND

The present invention relates to a bale forming apparatus and a bale forming method for forming cylindrical bales.

A bale forming apparatus as used for agricultural purposes is an agricultural vehicle to form bales of crop material. The bale forming apparatus usually comprises an intake device to take up crop material from a ground surface and a bale forming device to form a bale from the crop material.

In a known embodiment, the bale forming device comprises at least one endless pressing belt, preferably several parallel endless belts, guided by guiding rollers. An outlet of the intake device is arranged between two guiding rollers so that crop material is fed between the two guiding rollers towards the endless belt(s). Due to the feeding of crop material between the two guiding rollers a bale forming chamber is formed by the belt(s). By further feeding crop material through the outlet the bale forming chamber can be filled until a bale with a desired diameter is obtained.

The bale forming chamber is surrounded by a fixed front housing and a pivotal tailgate of the bale forming apparatus. For forming a bale under pressure the tailgate must be connected with the front housing. Opening of the pivotal tailgate ejects and thereby releases the bale from the bale forming chamber. Before ejecting a bale, this bale must be wrapped into a net or foil. Before the formation of a new bale under pressure can be started, the pivotal tailgate must be closed again.

The wrapping of the bale as well as the opening and closing of the tailgate take considerable time during which the bale forming apparatus cannot be used for formation of a new bale. This has the consequence that the intake of new crop material has to be temporarily interrupted by stopping the forward movement of the bale forming apparatus over the ground surface.

To overcome this disadvantage, several concepts for so-called continuous round balers were presented.

State of the Art

Figure 1:
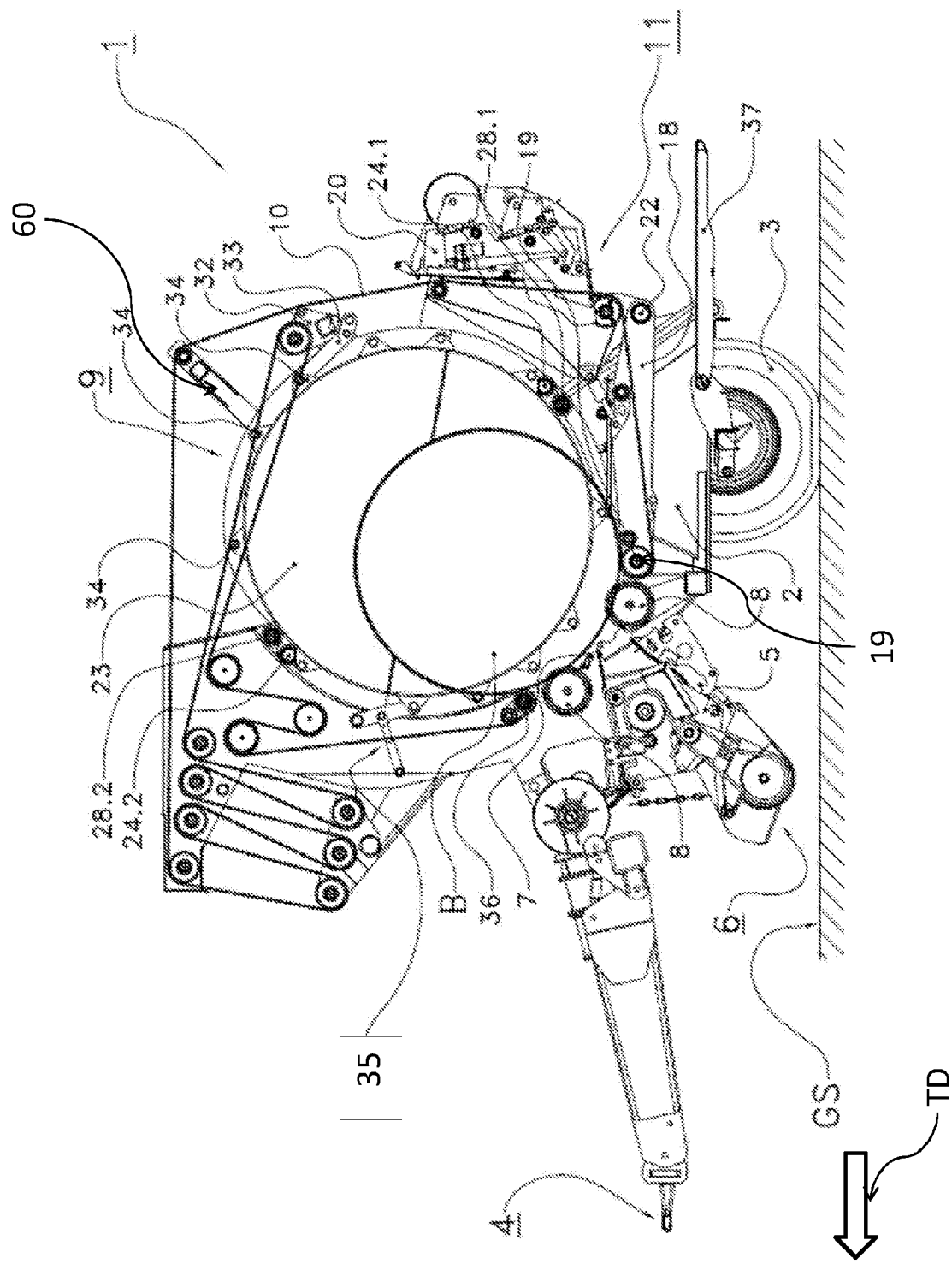

WO 2011/053120 A1 and US 2012/0204738 A1 disclose a round baler working in a continuous manner. An endless belt 10 is guided around four moveable guiding elements 11a, 11b, 11c, and 11d and around a fixed guiding element 12 and a tensioning element 13. The four moveable guiding elements 11a, 11b, 11c, 11d are mounted on four arms 15 which in turn are mounted on a rotatable element 16, cf. FIG. 1. Every arm 15 can be rotated by means of an actuator 16. The two moveable guiding elements 11a, 11b form a first pair. The two moveable guiding elements 11c, 11d form a second pair. Every pair can be moved into an intake position, a release position, and a back end support position. This movement is effected by rotating the arms 15 around a horizontal axis through the rotatable element 16. FIG. 1 shows the first pair with the guiding elements 11a, 11b in the intake position near the outlet 8 of an intake device. The baling chamber is formed between these two guiding elements 11a, 11b. After the bale B is created, the first pair is rotated from the intake position into a release position, cf. FIG. 2. The bale B can be ejected. Simultaneously the second pair 11c, 11d is moved into the intake position such that the creation of a second bale B2 can be started before the first bale B is ejected.

Problem, Solution

The problem solved by the invention is to provide a bale forming apparatus and a bale forming method where a bale can be stored in the bale forming apparatus and behind the outlet through which material is conveyed such that a continuous operation of the bale forming apparatus is possible and such that the stored bale can be ejected without the need of a specific actuator.

This problem is solved by a bale forming apparatus with the features of claim 1 and a bale forming method with the features of claim 14. Preferred embodiments are specified in the depending claims.

The invention refers to a bale forming apparatus and a bale forming method for forming cylindrical bales of material.

An intake device conveys material through an outlet into a bale forming chamber which is surrounded by a bale forming means and which is situated adjacent to the outlet.

A front housing part and a rear housing part are adapted for being connected with each other to form a bale forming housing. This bale forming housing surrounds the bale forming chamber. The bale forming means creates a bale in the bale forming chamber.

The rear housing part comprises a rear wall part and a bale carrying member. A pushing device pushes a bale formed in the bale forming chamber away from the outlet. The rear housing part is in the bale receiving position. After having been pushed, the bale is carried on the bale carrying member.

The connection between the front housing part and the rear housing part can be released. The rear housing part can be pivoted with respect to the front housing part around an angle of at least 90 degrees.

A pivoting mechanism can pivot the rear housing part into a bale receiving position and from the bale receiving position into a bale ejecting position. The pivoting mechanism pivots the rear housing part with the carrying member carrying the bale into the bale ejecting position. During this movement the rear housing part is pivoted around at least 90 degrees.

The rear housing part being in the bale ejecting position releases and thereby ejects the bale.

Advantages

The carrying member provides a buffer space for a cylindrical bale which is no longer growing but which must be completed before being ejected. This buffer space is provided by the bale carrying member carrying the bale and the rear wall part supporting laterally the bale. The buffer space is arranged outside of the bale forming chamber. This completion of the bale on the bale carrying member may comprise the step of wrapping the bale in a net, in a foil or in a yarn. As the carrying member provides the buffer space, further material conveyed through the outlet can be processed. In particular this feature enables a continuous operation.

The bale pushing device pushes a cylindrical bale onto the bale carrying member. This bale is carried by the carrying member while the bale is completed outside of the bale forming chamber and when the rear housing part is pivoted into the bale ejecting position. During this pivotal movement the bale is no longer supported by the front housing but only by the carrying member of the rear housing part.

The bale pushing device is only required for pushing the bale onto the bale carrying member. It is not required for rejecting the bale out of the bale forming apparatus. Therefore it is possible to operate the bale pushing device while the rear housing part is still connected with the front housing part. It is not necessary to use the bale pushing device as an actuator for ejecting the bale.

Pivoting the rear housing part with the bale into the bale ejecting position releases and thereby ejects the bale. The bale drops from the carrying member by force of gravity. The bale is released by pivoting the rear housing part. No specific actuator for releasing or removing the bale out of the bale forming apparatus is required.

According to the invention the rear housing part is pivoted around at least 90 degrees, preferably more than 90 degrees. Therefore the rear housing part in the bale ejecting position provides a broad aperture for releasing a bale. Neither the bale carrying member nor the rear wall part form an obstacle for ejecting the bale. It is possible to provide a long or a thick carrying member which is able for carrying a large or heavy cylindrical bale.

EMBODIMENTS

Preferably the carrying member is pivoted downwards when the bale is pushed onto the carrying member. This embodiment yields a space into which a part of the bale pushing device can engage when pushing the bale. This embodiment yields a shorter bale forming apparatus.

Preferably the step of pivoting downwards the bale carrying member is performed before the rear housing part is released from the front housing part. The housing still supports the bale forming means under the pressure of a bale and enables to keep the bale under pressure.

In one embodiment the bale forming means is guided around several guiding members. These guiding members can comprise rollers. At least one guiding member is mounted at the bale carrying member and one further guiding member at the rear wall part. This embodiment ensures that the bale forming means keeps a bale also after the bale has been pushed onto the carrying member and while the rear housing part is pivoted into the bale ejecting position. In addition the guided bale forming means contributes to eject the bale.

Preferably the pivoting mechanism pivots the rear housing part with the carrying member carrying a bale from the bale receiving position into a bale supporting position. This pivotal movement increases the distance between the bale on the carrying member and the outlet. This pivotal movement therefore provides more space for collecting material which is conveyed through the outlet. This material may be pressed together to form a new bale or may be otherwise processed. The formation of the "old" bale on the carrying member is completed, e.g. by wrapping the bale, as long as the rear housing part is in the bale supporting position. Afterwards the rear housing part with the finished bale on the carrying member is pivoted from the bale supporting position around at least 90 degrees into the bale ejecting position.

Preferably the rear housing part is pivotally connected with the front housing part by means of a lever arrangement. This lever arrangement is pivotally connected with the front housing part or with the rear housing part or preferably with both housing parts. Thanks to this lever arrangement the rear housing part can be pivoted such that it can be shifted away from the front housing part. This feature enables the rear housing part to carry even a thick cylindrical bale, i.e. a bale with a large diameter. It is possible to create a bale in the bale forming chamber while the rear housing part is rigidly connected with the front housing part. Afterwards the bale is pushed onto the bale carrying member. For enabling this step the rear housing part is released. The bale or an actuator shifts and/or pivots the rear housing part away from the front housing part. The lever arrangement still connects the front housing part with the rear housing part and prevents the bale from falling apart.

In one embodiment the bale is still surrounded by the bale forming means and the bale forming means is supporting by the housing part connected by the lever arrangement. Preferably the rear housing part is pivoted into a bale supporting position by shifting it away from the outlet.

In one embodiment the pivoting mechanism is connected with the rear housing part by means of a lever mechanism. This lever mechanism is pivotally connected with the rear housing part in at least two distinct connection areas. By this embodiment the rear housing part can be pivoted around two different pivoting axes which are spaced apart from each other. Preferably a kinematic parallelogram structure is formed. The pivoting mechanism is mechanically connected with this lever mechanism and is connected with the front housing part. The pivoting mechanism moves this lever mechanism. Moving the lever mechanism causes the rear housing part to be pivoted with respect to the front housing part around these two pivoting axes. This embodiment provides a robust way of pivoting the rear housing part even if a big bale exerts a high pressure onto the rear housing part.

In one embodiment a bale size sensor measures the diameter of a cylindrical bale on the bale carrying member or of a bale in the bale forming chamber. This bale size sensor may measure a distance between itself and the circumferential surface of the bale on the bale carrying member, e.g. by means of an ultrasonic sensor. In a further embodiment the bale size sensor may measure the pressure of the bale in the bale forming chamber exerted onto the bale forming means or the tension exerted by the bale to the bale forming means. The pivoting mechanism pivots the rear housing part with respect to the front housing part around a pivoting angle which depends on the measured bale size. The greater the bale diameter is the larger is the pivoting angle. This embodiment further reduces the risk that a bale cannot be ejected. On the other hand the rear housing part is not pivoted more than necessary. Therefore this embodiment saves time and energy.

In one embodiment the lever arrangement comprises two left lever arms and two right lever arms which contribute to form the kinematic parallelogram structure. The rear housing part is between the left lever arms and the right lever arms. The terms left and right refers to the pivoting direction and which the rear housing part can be pivoting. These lever arms are pivotally connected with the rear housing part in two spaced-apart pivoting axes. All lever arms are connected with the pivoting mechanism. Preferably the lever arms are pivotally connected with the pivoting mechanism. This embodiment provides a very robust construction. The robustness is still increased if a further lever arm connects the two left lever arms and a further right lever arm connects the two right lever arms.

In one embodiment an inclination sensor measures the inclination of the bale forming apparatus on the ground. The pivoting angle around which the rear housing part is pivoted depends on the measured inclination. This embodiment further reduces the risk that the bale cannot be ejected even if the travelling direction of the bale forming apparatus slops downwards such that the bale must be ejected in an uphill direction.

DESCRIPTION OF EMBODIMENT

Figure 2:
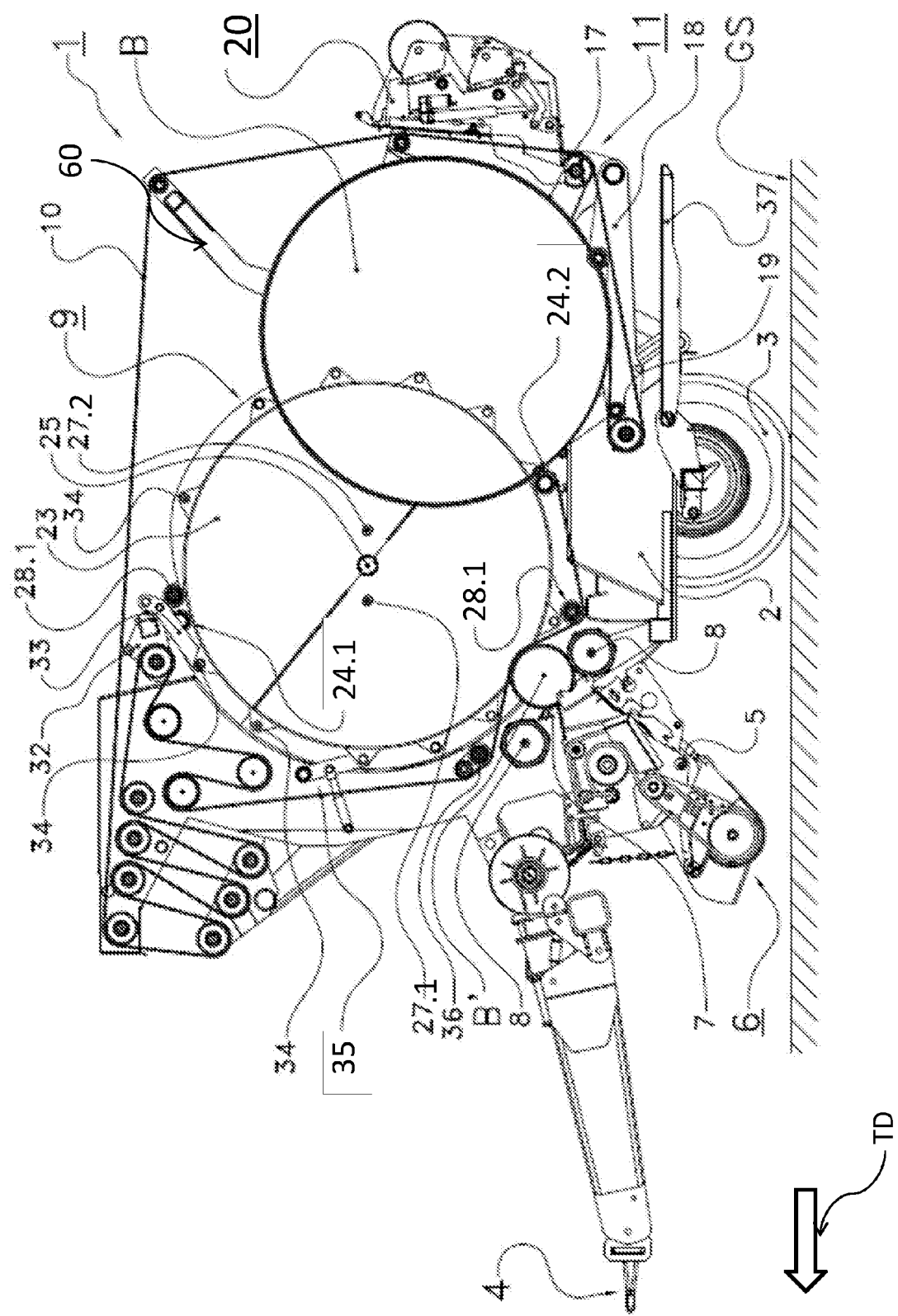
Figure 3:
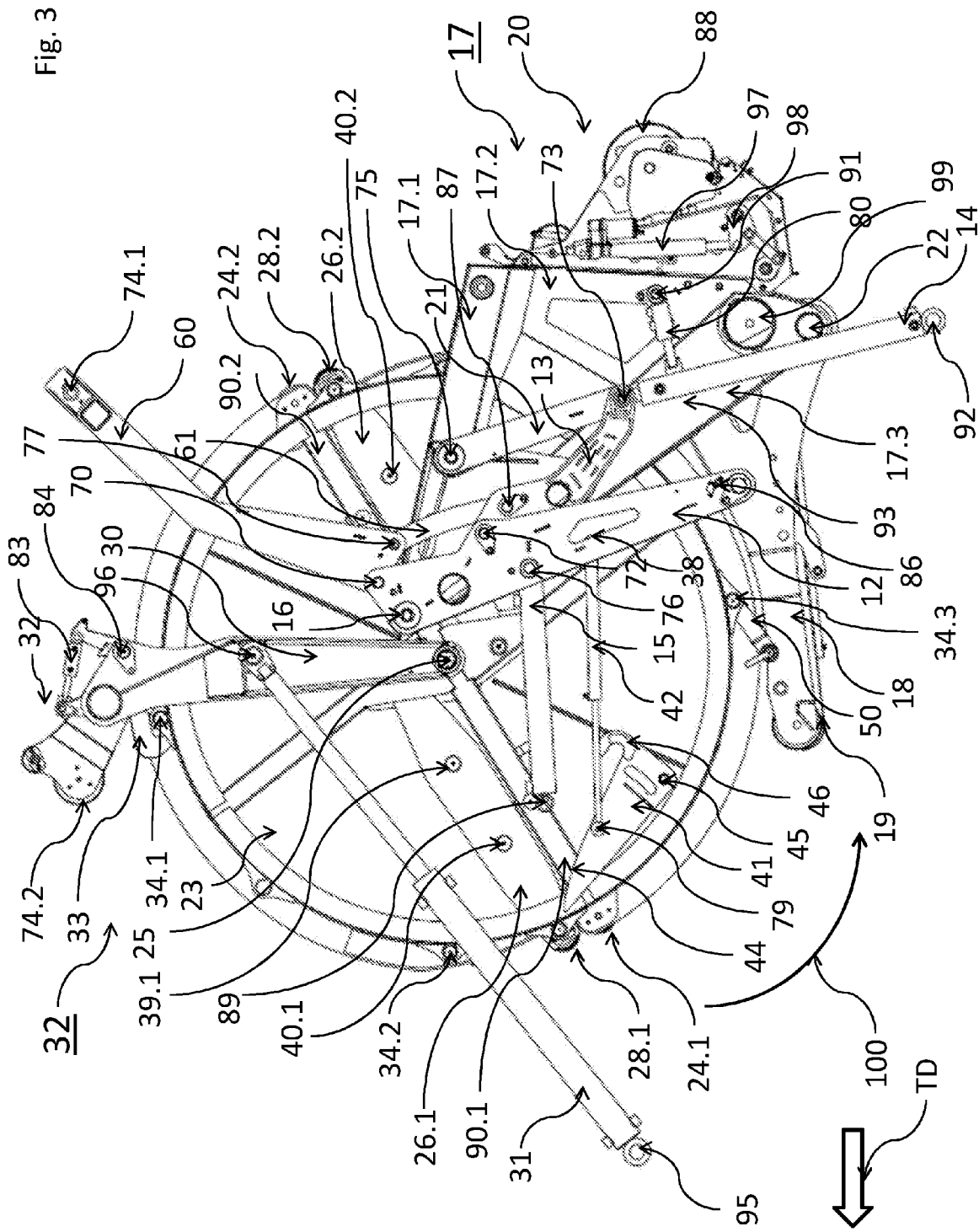
Figure 4:
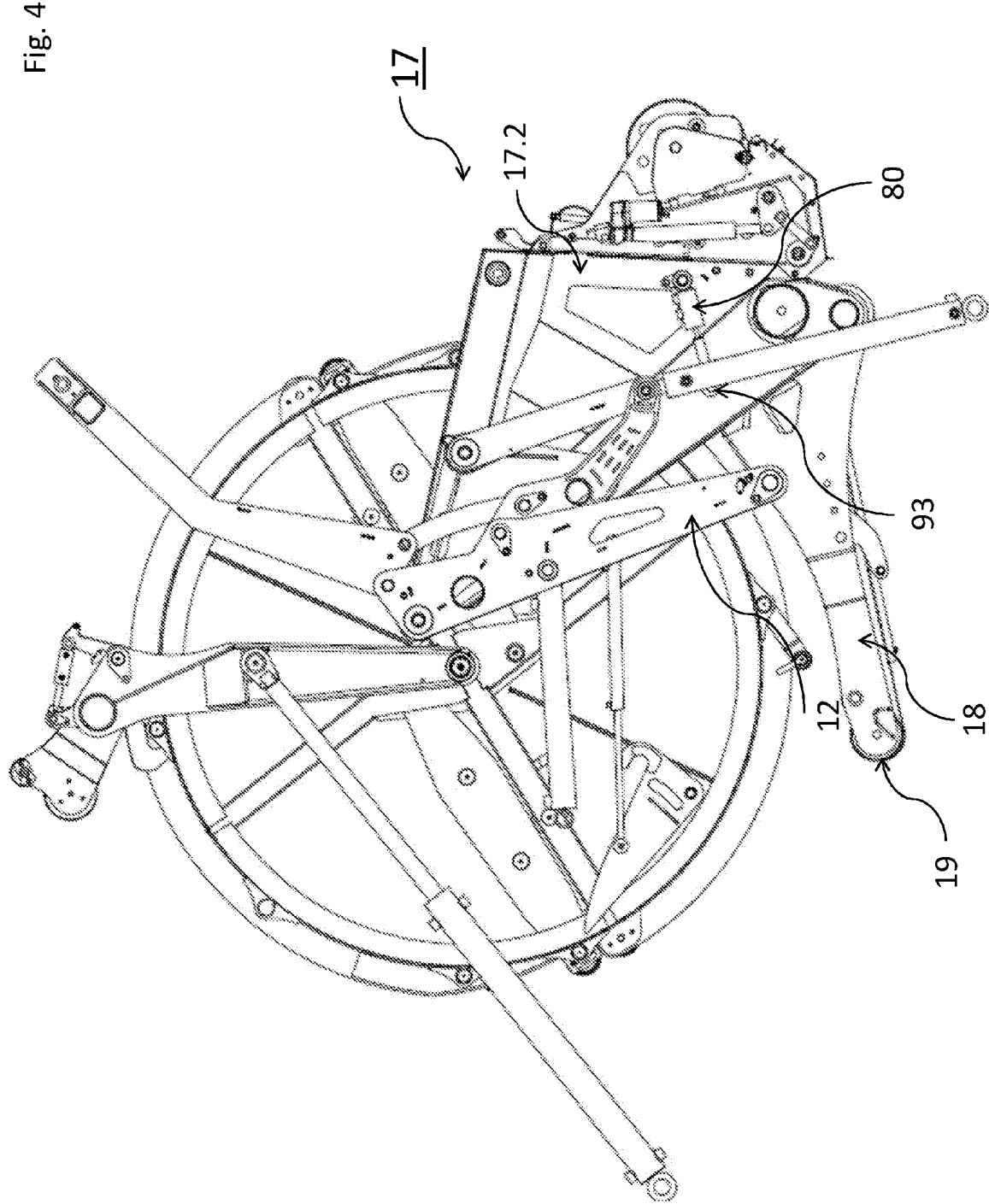
Figure 5:
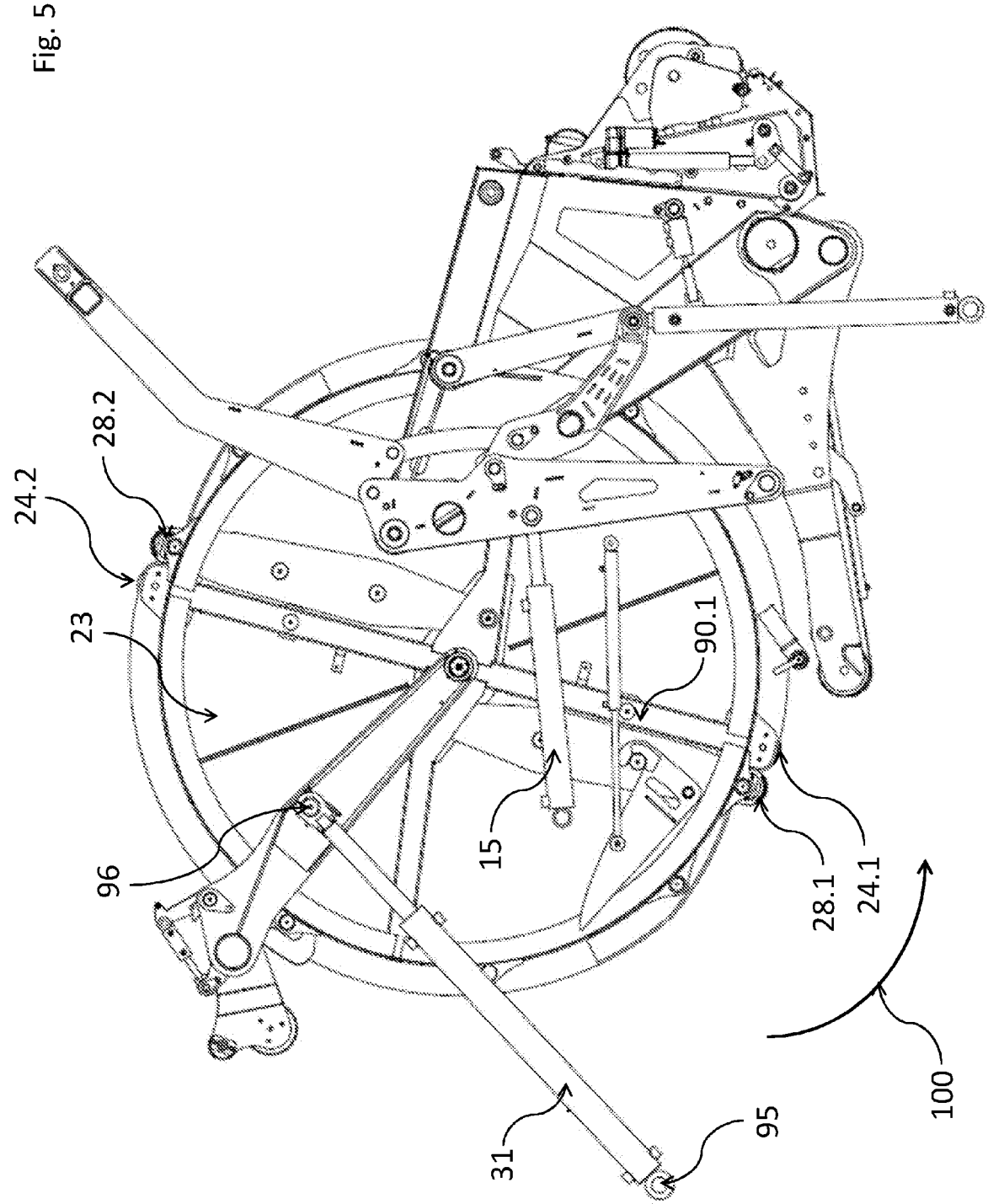
Figure 6:
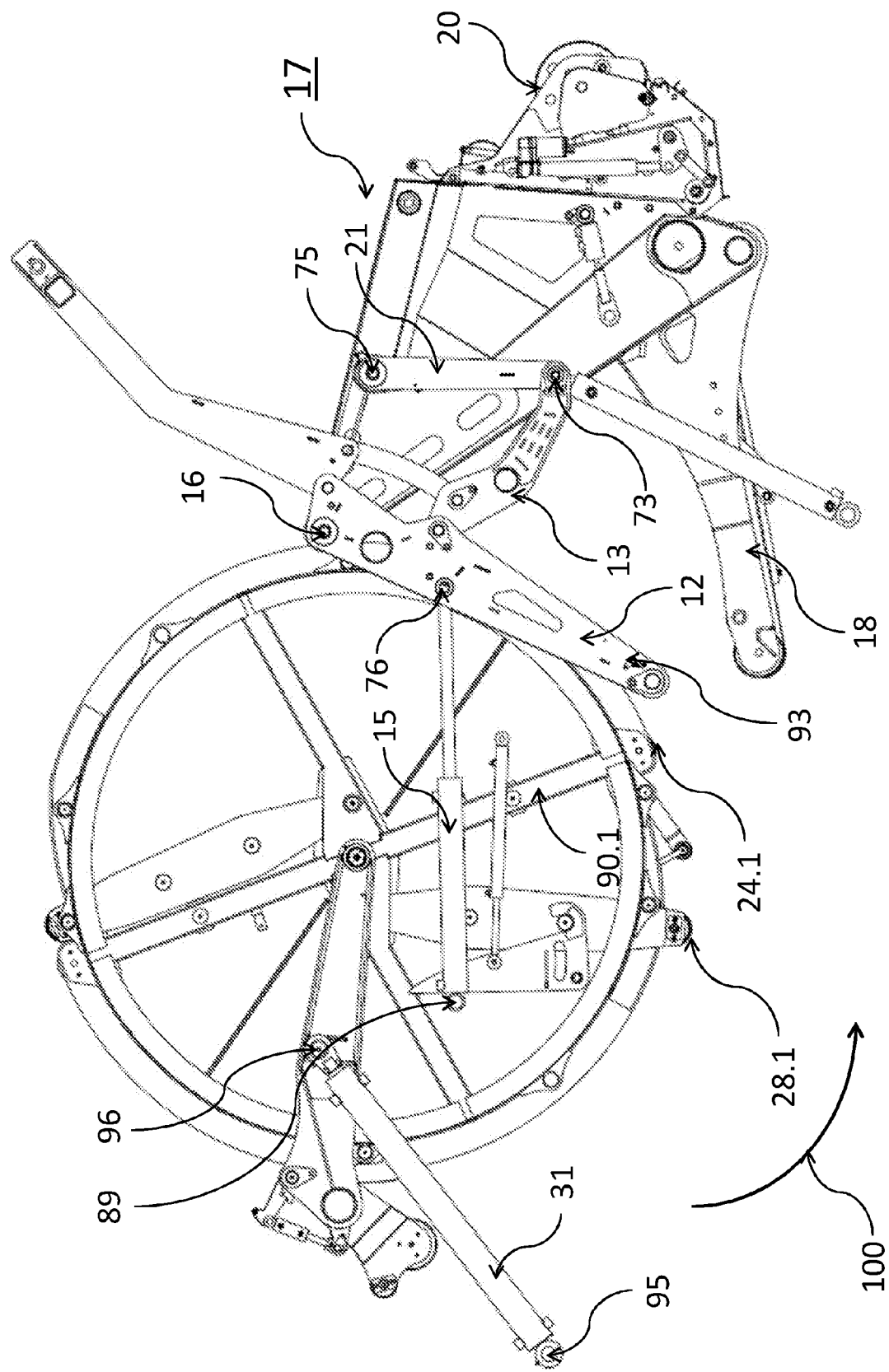
Figure 7:
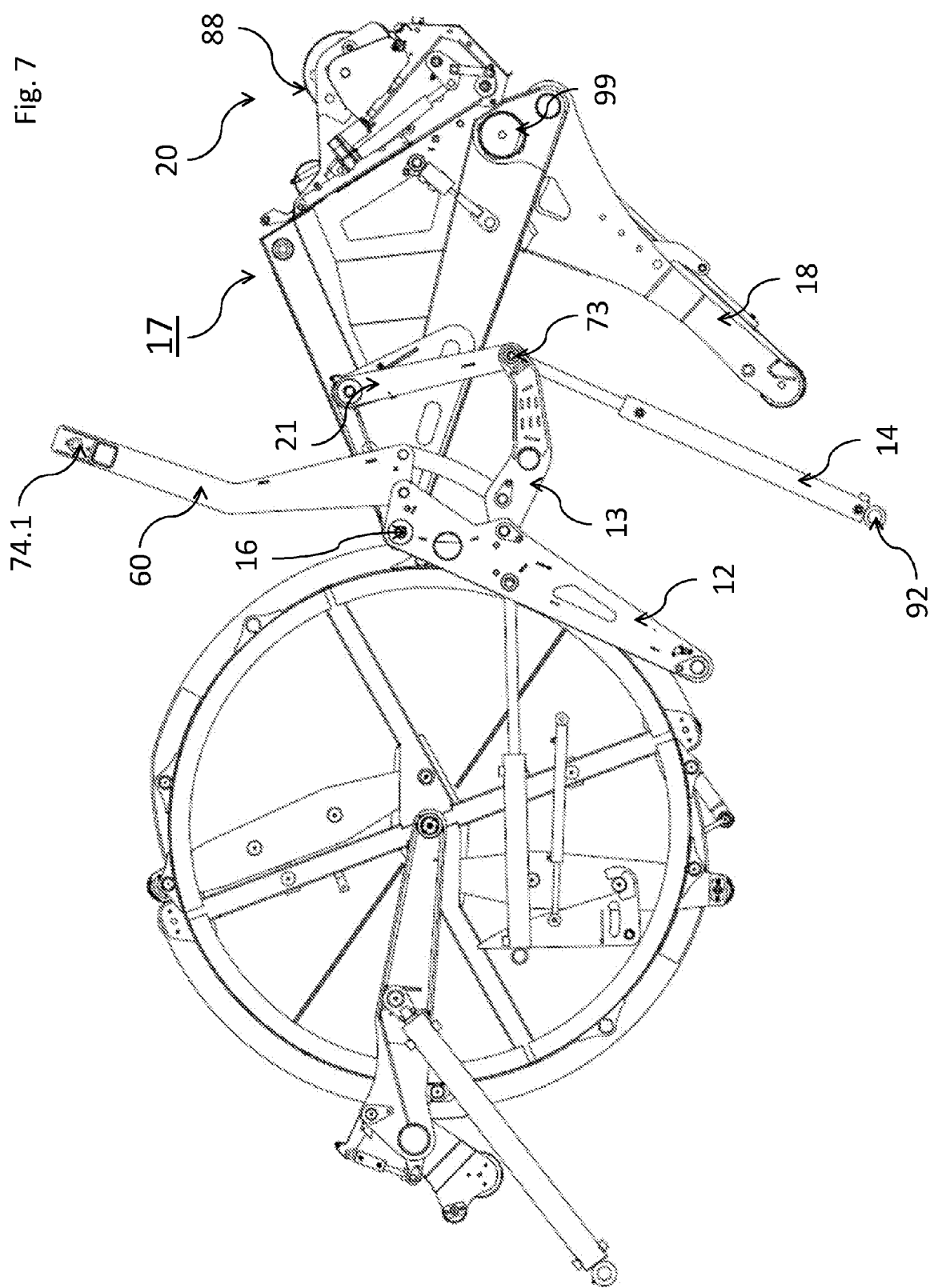
Figure 8:
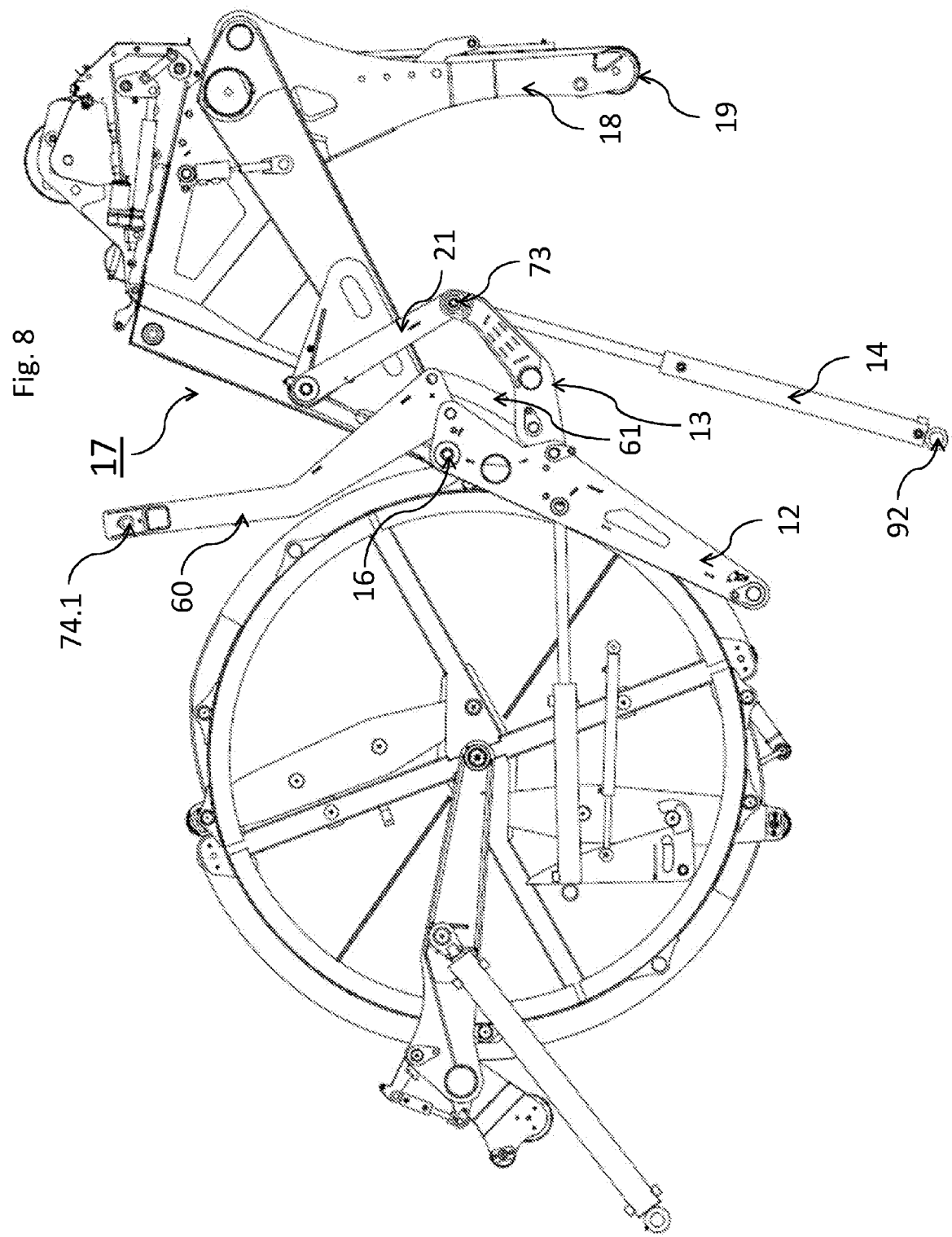
Figure 9:
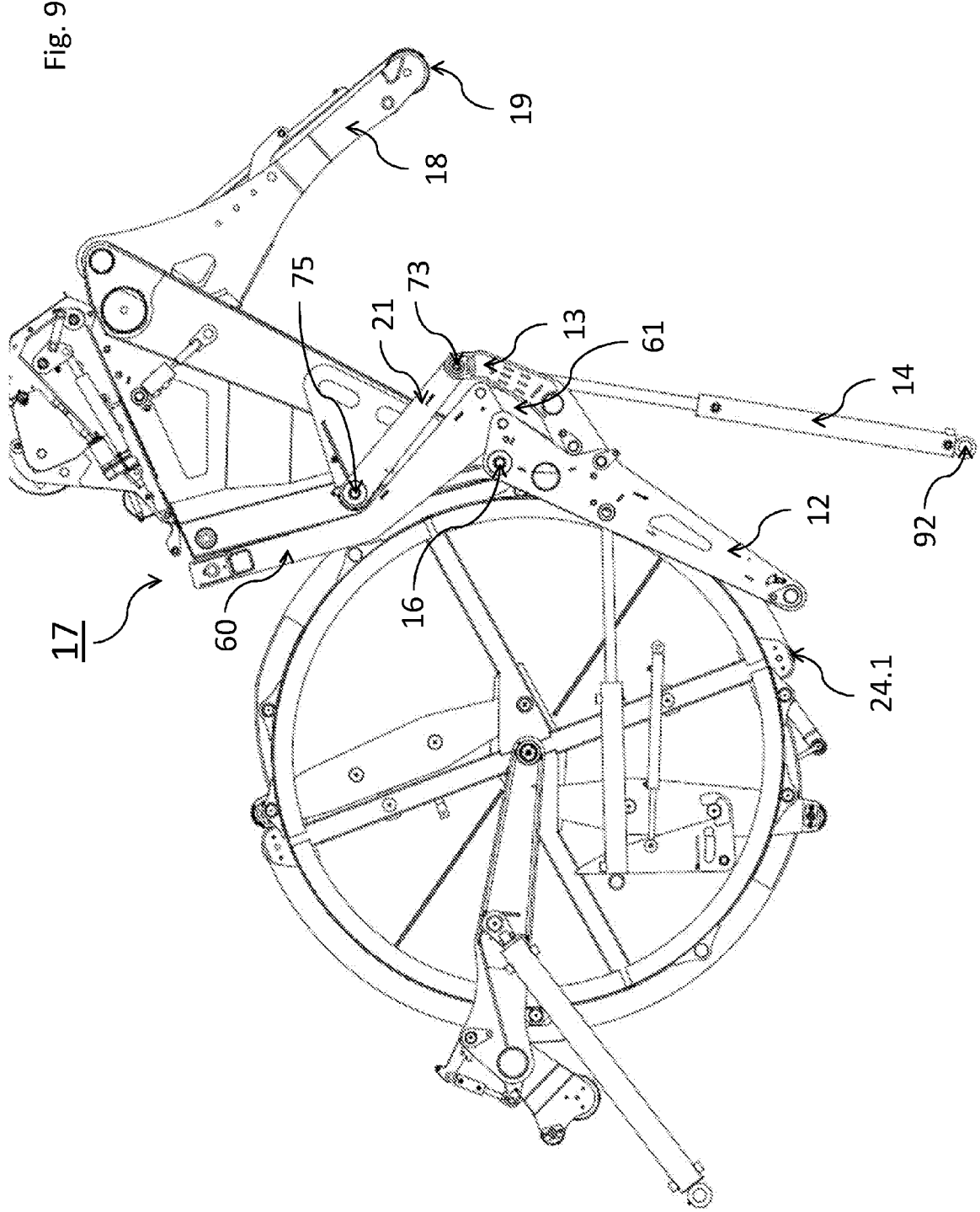
Figure 10:
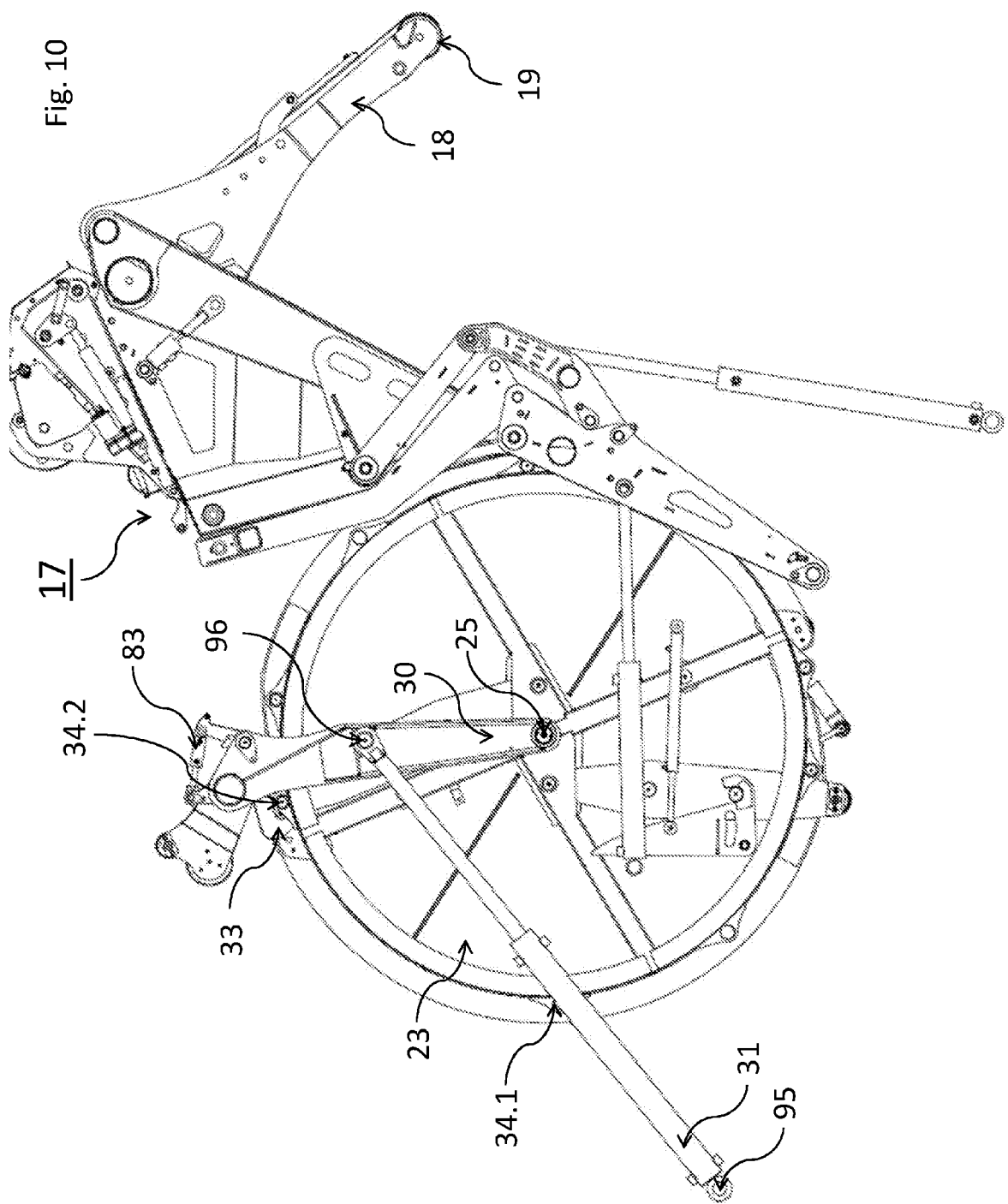
Figure 11:
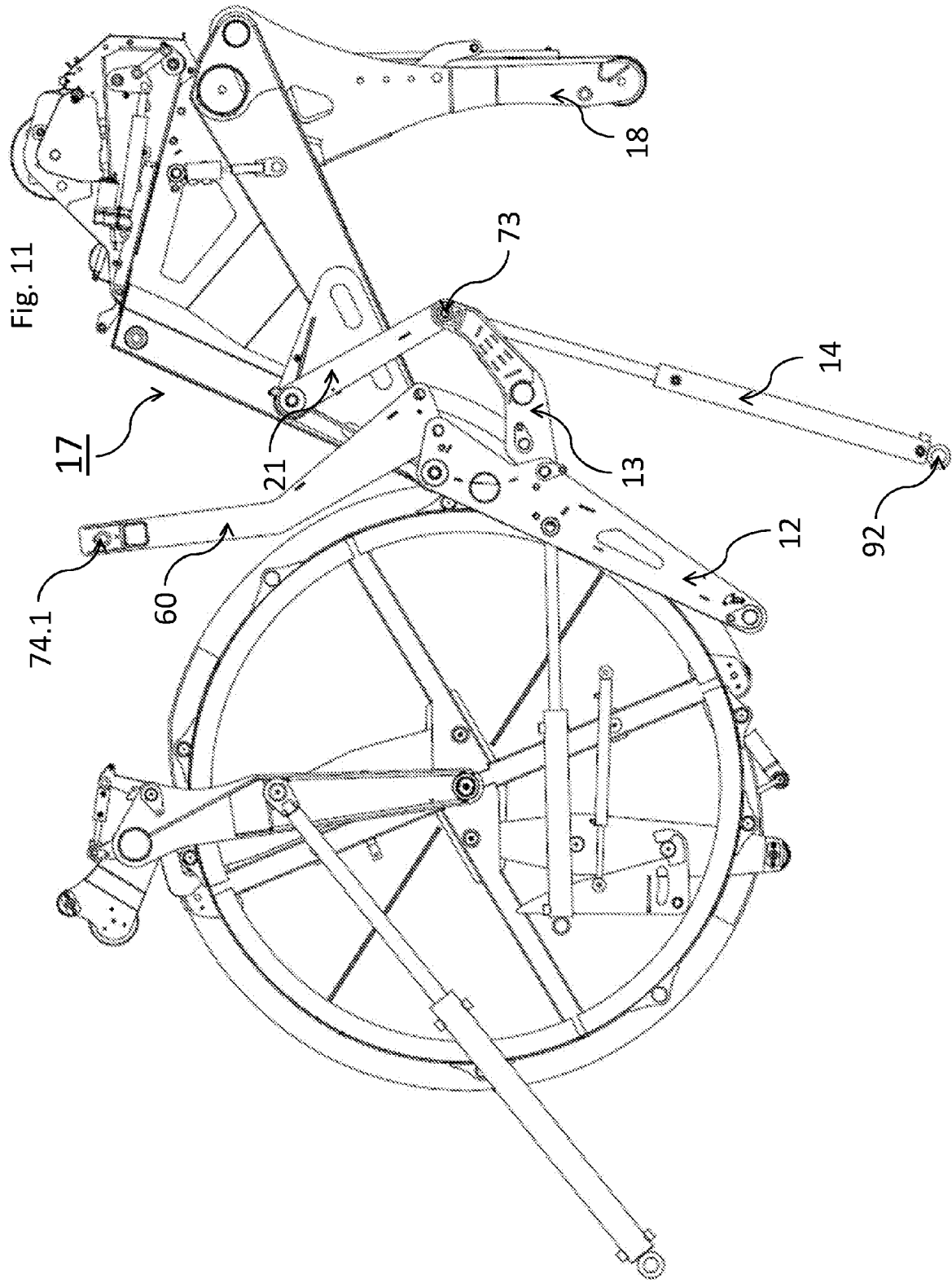
Figure 12:
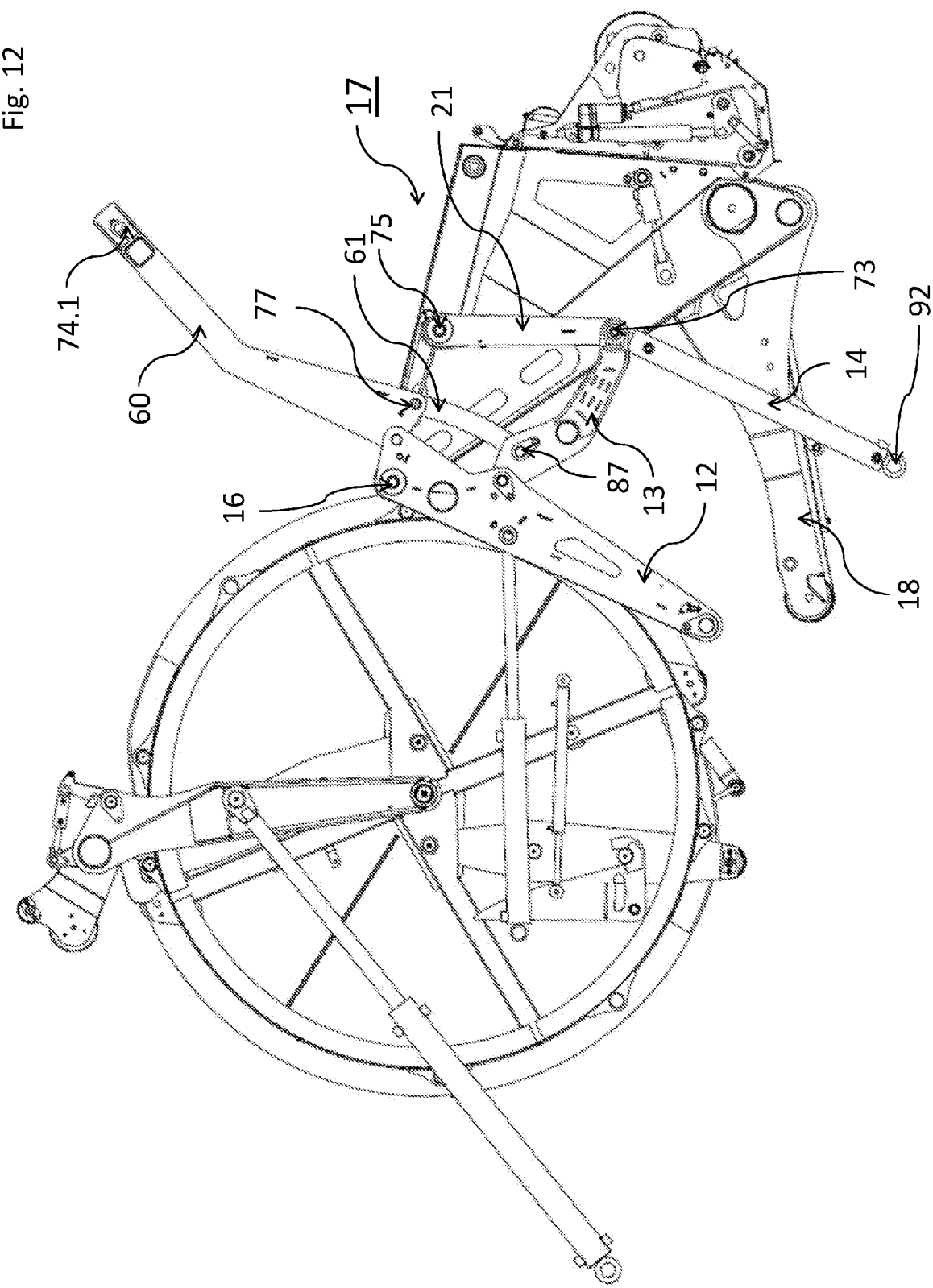
Figure 13:
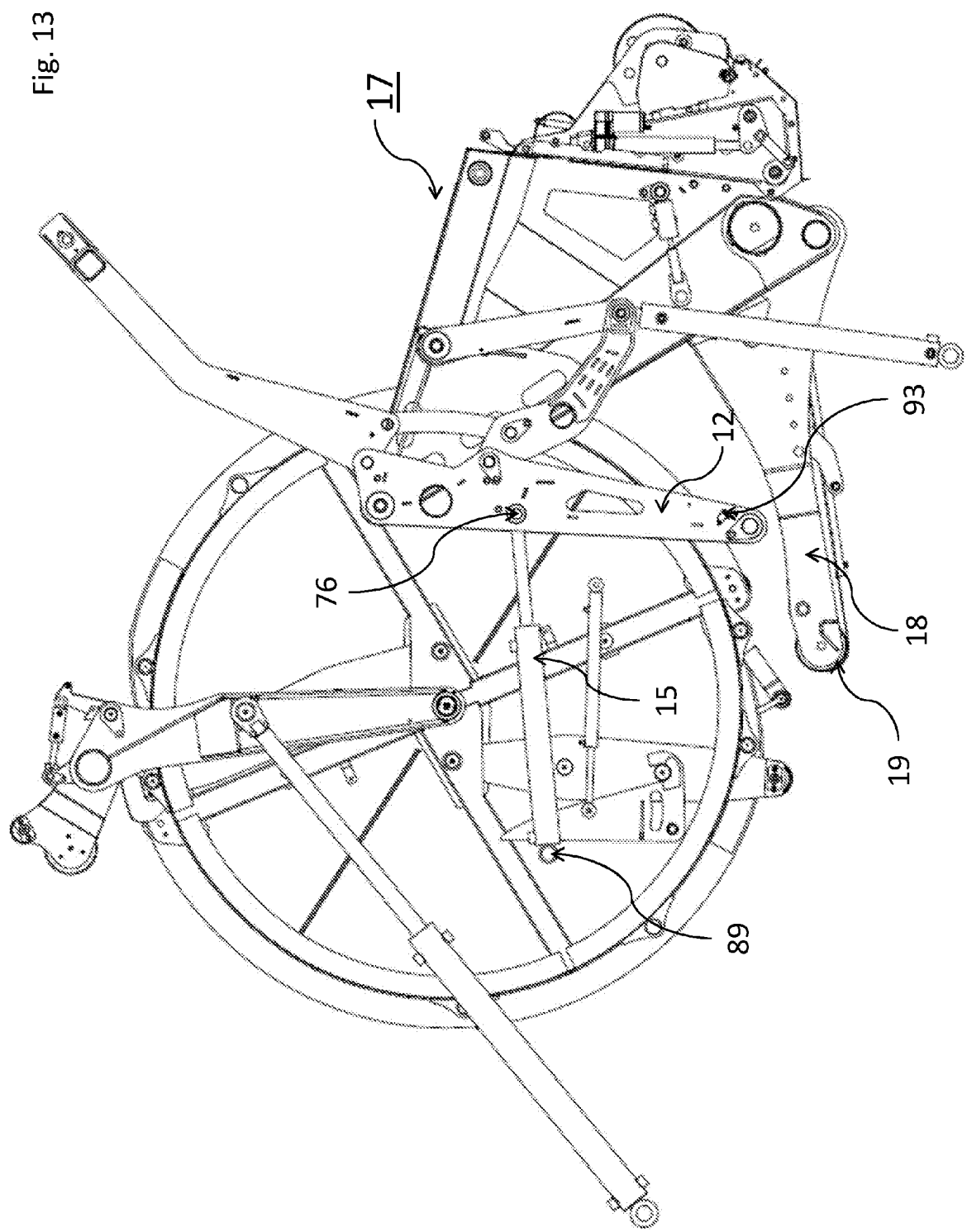
Figure 14:
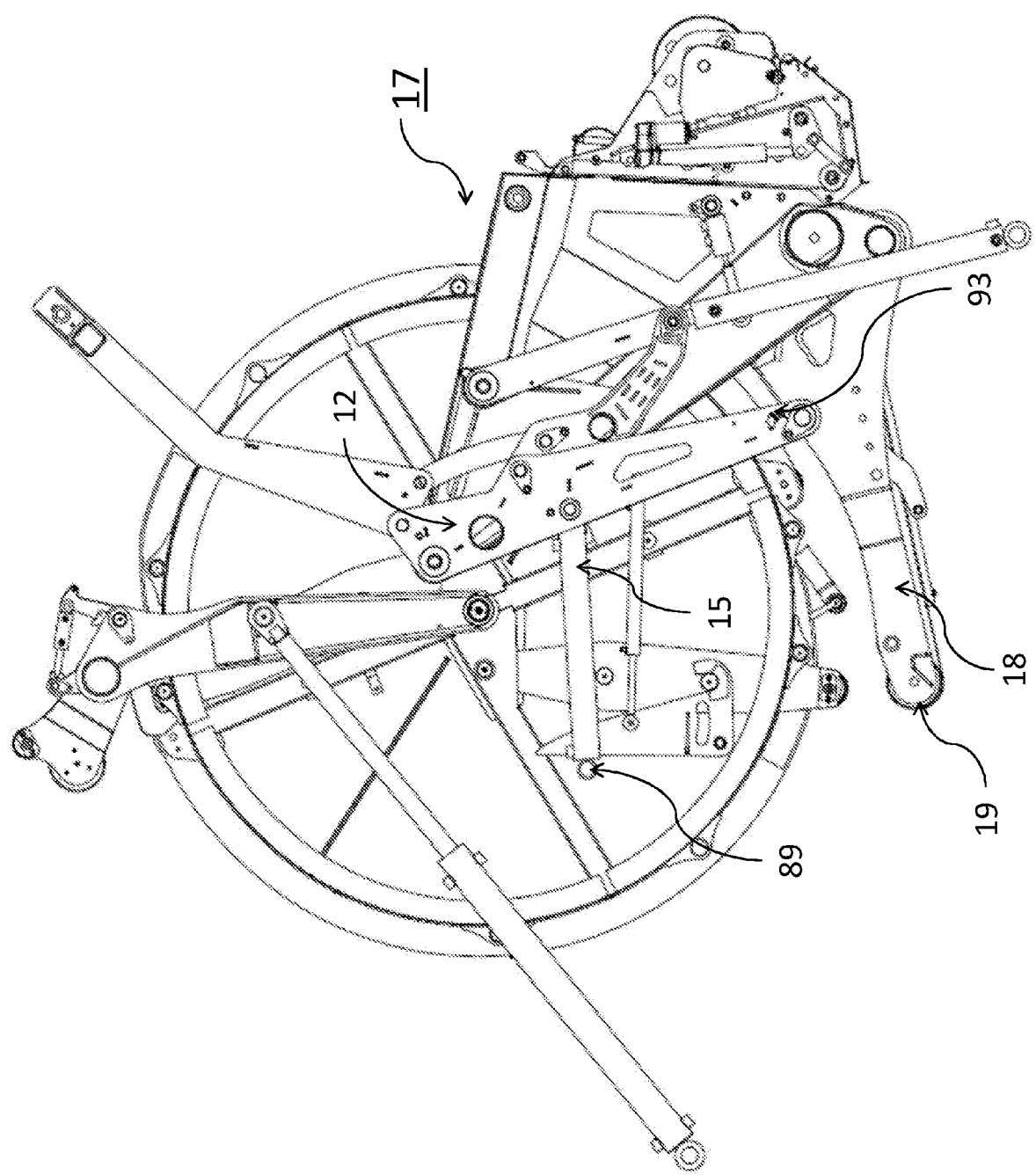
Figure 15:
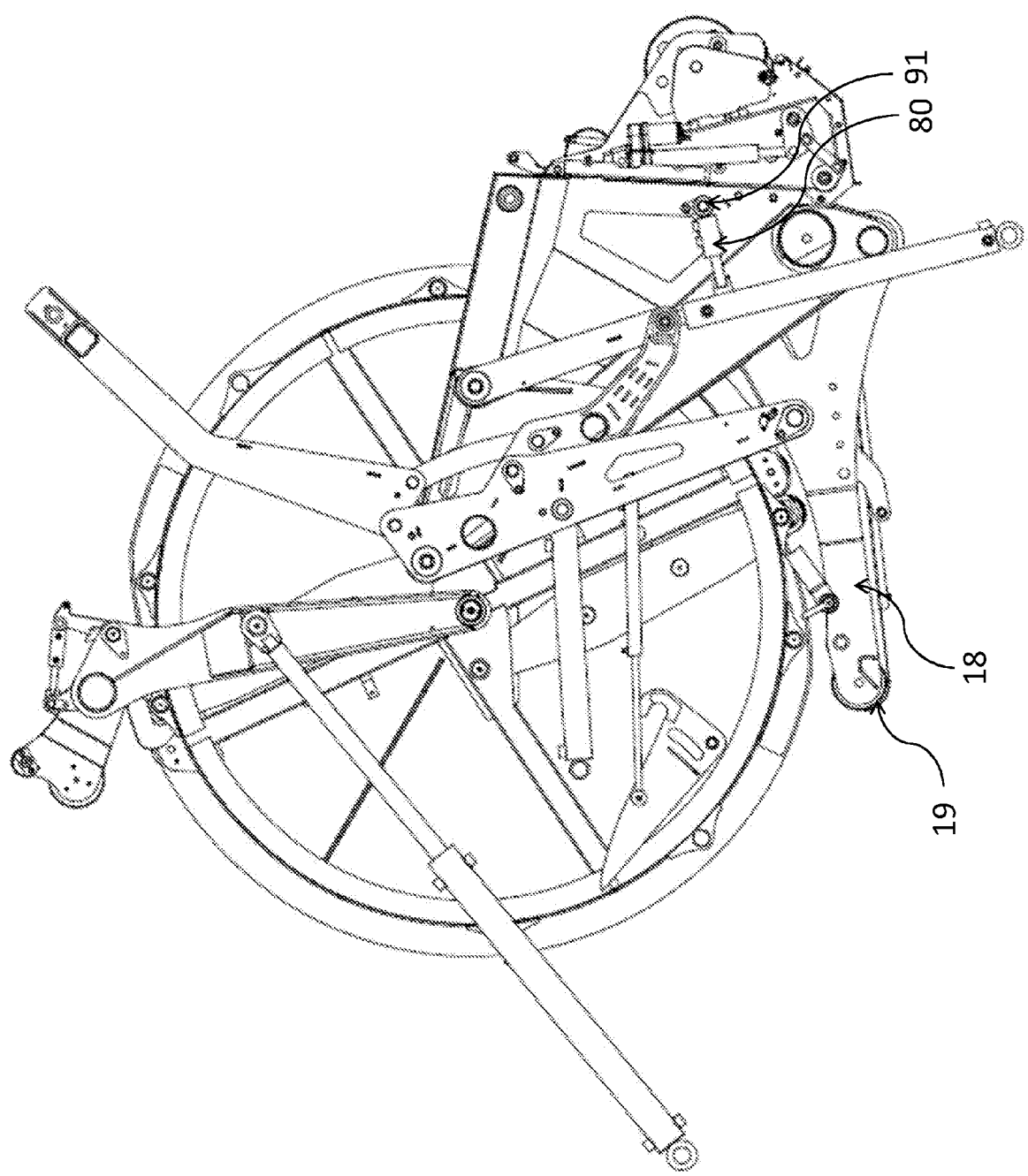

In the following an embodiment of the invention is described with reference to the following figures:

FIG. 1 the bale forming apparatus before starting to create a bale;

FIG. 2 the bale forming apparatus after having pushed a bale onto the tailgate bottom and after having started forming a new bale;

FIG. 3 in details the tailgate, the lever mechanism, and the pivoting mechanism for pivoting the tailgate via the lever mechanism;

FIG. 4 the arrangement of FIG. 3 with the tailgate bottom in a lowered position;

FIG. 5 the arrangement of FIG. 4 in an intermediate position while pivoting the tailgate in the bale supporting position;

FIG. 6 the arrangement of FIG. 5 with the tailgate in the bale supporting position;

FIG. 7 the arrangement of FIG. 6 with the tailgate in an intermediate position while pivoting the tailgate in the bale ejecting position;

FIG. 8 the arrangement of FIG. 7 with the tailgate in a later intermediate position while pivoting the tailgate in the bale ejecting position;

FIG. 9 the arrangement of FIG. 8 with the tailgate in the bale ejecting position;

FIG. 10 the arrangement of FIG. 9 with the tailgate in the bale ejecting position and the actuator arm being pivoted in the opposite direction;

FIG. 11 the arrangement of FIG. 10 with the bale ejected tailgate in an intermediate position while pivoting the tailgate back into the bale receiving position;

FIG. 12 the arrangement of FIG. 11 with the tailgate in a later intermediate position while pivoting the tailgate back into the bale receiving position and the tensioning arm being pivoted;

FIG. 13 the arrangement of FIG. 12 with the tailgate in the bale supporting while pivoting the tailgate back into the bale receiving position;

FIG. 14 the arrangement of FIG. 13 with the tailgate pivoted back in the bale receiving position and the tailgate bottom in the lowered position;

FIG. 15 the arrangement of FIG. 14 with the tailgate pivoted back in the bale receiving position and the tailgate bottom in a raised position.

FIG. 1 shows a bale forming apparatus, generally indicated with reference numeral 1. The bale forming apparatus 1 comprises a frame 2 which is supported by wheels 3. The bale forming apparatus 1 is configured to be connected at its front end 4 to a pulling vehicle, for instance to a tractor.

The bale forming apparatus 1 comprises an intake device 5 to take in crop material, such as silage, grass, hay, from a ground surface GS. The intake device 5 comprises an inlet 6 and an outlet 7. At opposite sides of the outlet 7 two stationary supporting rollers 8 are provided. The rotating axes of these two supporting rollers 8 are perpendicular to the drawing plane of FIG. 1.

Via the inlet 6 crop material is taken from the ground surface GS and transported to the outlet 7. A drum provided at the inlet 6 may be provided with tines to facilitate the picking up of crop material. The tines can be mounted in a flexible manner such that they can adapt to the ground profile.

The frame 2 comprises a front housing part. A bale forming device 9 is arranged on the frame 2 to form bales of crop material. The bale forming device 9 comprises at least one endless belt 10 and a number of guiding elements supporting the endless belt 10. Preferably several belts 10 are arranged parallel to each other. The belt(s) 10 operate as the bale forming means. A tensioning device is provided to maintain tension in the belt(s) 10.

The back end of the bale forming apparatus 1 is provided with a tailgate 11 which is constructed to support in a support area a bale B arranged on the tailgate 11. The tailgate 11 is pivotal about a rotation axis 16. In the preferred embodiment the tailgate 11 is at least movable (pivotal) between a bale receiving position, a bale supporting position and a bale ejecting position. This tailgate 11 serves as the bale supporting construction.

In FIG. 1, the tailgate 11 is shown in the bale receiving position. This bale receiving position is also the transport position, i.e. the position in which the tailgate 11 is preferably positioned when the bale forming apparatus is not used to create bales but is pulled over a public street, e.g.

The bale forming apparatus 1 is configured to hold a bale in a first bale position and a second bale position. The first bale position is arranged next to the outlet 7 of the intake device 5, and the second bale position is spaced away from the outlet 7.

In the first bale position, the bale formed or being formed is mainly supported by the two stationary supporting rollers 8 arranged at opposite sides of the outlet 7 of the intake device 5, but may also partially be supported by the tailgate 11. The bale in the first bale position is in a bale forming chamber and is surrounded by the bale forming means 10.

The second bale position is defined by the bale supporting position of the tailgate 11. Thus, in this bale supporting position, the tailgate 11 holds a bale in the second bale position. This second bale position is positioned such that a new bale can be at least partially formed in the first bale position before the bale in the second bale position is ejected by the bale forming apparatus 1. Therefore the bale forming apparatus 1 carries at the same time a complete bale B on the bale supporting construction 11 and an increasing bale B' in the bale forming chamber adjacent to the outlet 8.

A bale can be transported from the first bale position to the second bale position by the following consecutive steps: moving the bale from the first bale position away from the outlet 7 and onto the tailgate 11 arranged in the bale receiving position and subsequently moving the tailgate 11 from the bale receiving position into the bale supporting position.

FIG. 3 shows the embodiment of the baler after a bale has formed and before the process of finishing and ejecting a bale has been started.

The bale has to be pushed onto a tailgate 11. This tailgate 11 operates as the rear housing part and comprises a tailgate frame 17 with tailgate frame parts 17.1, 17.2, 17.3, 17.4 and a tailgate bottom 18 carrying a tailgate bottom roller 19.

The tailgate parts 17.1, 17.2, 17.3, 17.4 are rigidly connected with each other. The bale is kept by the tailgate frame 17 and by the tailgate bottom 18. The tailgate bottom 18 supports the bale from below. The tailgate frame 17 supports laterally the bale from several sides and limits the lateral movement of the bale. The tailgate frame 17 serves as the rear wall part.

The following parts pivot the tailgate 11 or the tailgate bottom 18:
a first tailgate lever arm 12,
a second tailgate lever arm 13,
a third tailgate lever arm 21,
a horizontal tailgate cylinder 15,
a vertical tailgate cylinder 14,
a tailgate bottom cylinder 18.

The first tailgate lever arm 12 is connected with the tailgate frame 17 in the pivoting axis 16. The third tailgate lever arm 21 is pivotally connected with the tailgate frame 17 in a pivoting axis 75. A distance between these two parallel pivoting axes 16, 75 occurs. The third tailgate lever arm 21 and the second tailgate lever arm 13 are pivotally connected with each other in a pivoting axis 73. The first tailgate lever arm 12 and the second tailgate lever arm 13 are pivotally connected in a pivoting axis 72. The first tailgate lever arm 12 is pivotally mounted at the front housing part of the frame 2 such that the first tailgate lever arm 12 can rotate around a stationary pivoting axis 86.

The tailgate frame 17 is not directly connected with the front housing part of the frame 2. In contrast, the tailgate frame 17 is pivotally connected with the frame 2 by means of the first tailgate lever arm 12 which pivotal connection forms a first lever. A second lever is formed by the vertical tailgate cylinder 14 together with the third tailgate lever arm 21. The two pivoting axes 16, 75 in which these two levers are connected with the tailgate frame 17 are spaced apart from each other. This embodiment enables the tailgate frame 17 to be moved away from the baling chamber over a quite great distance and with a quite large pivoting angle such that even a big bale can be carried by the tailgate 11.

The horizontal tailgate cylinder 15 is in its left end connected with the frame 2 in a stationary pivoting axis 89. At its right end the horizontal tailgate cylinder 15 is pivotally connected with the first tailgate lever arm 12 in a pivoting axis 76. FIG. 3 shows the horizontal tailgate cylinder 15 in a retracted state: The piston rod is in the cylinder housing.

The vertical tailgate cylinder 14 is in its lower end pivotally connected with the frame 2 in a stationary pivoting axis 92. This vertical tailgate cylinder 14 is in its upper end connected with the third tailgate lever arm 21 as well as with the second tailgate lever arm 13 in the same pivoting axis 73. The vertical tailgate cylinder 14 can therefore move the pivoting axis 73 away from the stationary pivoting axis 92 and towards the pivoting axis 92. Moving the pivoting axis 73 causes the first tailgate lever arm 12 to pivot the tailgate frame 17 with respect to the third tailgate lever arm 21 around the pivoting axis 16. The second tailgate lever arm 13 connects the first tailgate lever arm 12 with the third tailgate lever arm 21 and limits the movement of the third tailgate lever arm 21. In FIG. 3 the vertical tailgate cylinder 14 is shown in a retracted state.

The tailgate bottom 18 is pivotally connected with the tailgate frame 17 and can be pivoted with respect to the tailgate frame 17 around a pivoting axis 22. The tailgate bottom 18 is pivoted by a tailgate bottom cylinder 80 which is shown in FIG. 3 in a horizontal position and in a retracted state. The tailgate bottom cylinder 80 is at its right end pivotally connected with the tailgate frame 17 in a pivoting axis 91. The tailgate bottom cylinder 80 is at its left end pivotally connected with the tailgate bottom 18 in a pivoting axis 93 (in FIG. 3 behind the cylinder 14).

In the embodiment all three cylinders 15, 14, 80 are double-acting and are operated as hydraulic cylinders. It is also possible to provide alternative actuating means, e.g. electrical cylinders or motors.

The side view of FIG. 3 shows the baler from the left side—seen in the travelling direction TD. The tailgate frame 17 and the tailgate bottom 18 are arranged between left tensioning lever arms 12, 13, 21 and left cylinders 14, 15, 80. Corresponding tensioning lever arms and further cylinders are mounted on the right side in a mirror-inverted manner. These further lever arms and cylinders are behind the bale—seen in the viewing direction of FIG. 3. The left first tailgate lever arm 12 and the corresponding right third tailgate lever arm both are pivotally connected in the three parallel pivoting axes 86, 16, 77. The tailgate frame 17 is arranged between these two tailgate lever arms. The similar statement holds for the other tailgate lever arms.

The pressing belts 10 are guided around several rollers, amongst them around the roller 74.1 at the free end of a pivotal tensioning arm 60. This tensioning arm 60 is pivotally connected with the first tailgate lever arm 12 in a pivoting axis 70. Pivoting the tensioning arm 60 will shift the roller 74.1 and will vary the tension of the pressing belts. Thereby the tensioning arm 60 can compensate a lower tension of the pressing belts 10 as a consequence of ejecting a bale B.

The tensioning arm 60 is further connected with the second tailgate lever arm 13 by means of a tensioning lever arm 61. This tensioning lever arm 61 is pivotally connected with the tensioning arm 60 in a pivoting axis 77. The tensioning lever arm 61 is further pivotally connected with the second tailgate lever arm 13 in a pivoting axis 87.

This arrangement for pivoting the tailgate frame 17 and the tensioning arm 60 forms two kinematic parallelograms structures. The first parallelogram structure is formed between the following pivoting axes:

the pivoting axis 73 between the second tailgate lever arm 13, the third tailgate lever arm 21 and the vertical tailgate cylinder 14, the pivoting axis 75 between the tailgate frame 17 and the third tailgate lever arm 21, the pivoting axis 72 between the second tailgate lever arm 13 and the first tailgate lever arm 12, and the pivoting axis 16 between the first tailgate lever arm 12 and the tailgate frame 17.

The second parallelogram structure is formed between the following pivoting axes:

the pivoting axis 77 between the tensioning lever arm 61 and the tensioning arm 60, the pivoting axis 70 between the tensioning arm 60 and the first tailgate lever arm 12, the pivoting axis 72 between the second tailgate lever arm 13 and the first tailgate lever arm 12, and the pivoting axis 87 between the tensioning lever arm 61 and the second tailgate lever arm 13.

This first kinematic parallelogram structure allows a robust and flexible pivotal movement of the tailgate frame 17. The tailgate frame 17 is pivoted by shifting this first kinematic parallelogram structure. The second kinematic parallelogram structure allows a robust and flexible pivotal movement of the tensioning arm 60. All pivoting axes just mentioned are perpendicular to the drawing plane of FIG. 3.

The bale is pushed onto the tailgate bottom 18 and towards the tailgate frame 17 either by means of a pushing roller 24.1 or of a pushing roller 24.2. Both pushing rollers 24.1, 24.2 can rotate around rotating axes which are horizontal and are parallel to the rotating axis of the cylindrical bale. The pushing rollers 24.1, 24.2 extend between two supporting disks. The side view of FIG. 1 shows the left supporting disk 23—seen in the travelling direction of the baler. The two pushing rollers 24.1, 24.2 cannot be shifted with respect to the supporting disks 23 but can only rotate around their own rotating axes. Seen in the viewing direction the supporting disk 23 is behind the frame 2 and behind the stationary pivoting axis 89 of the horizontal tailgate cylinder 15.

The frame 2 and the bale B are not shown in FIG. 3 to FIG. 15.

The pushing roller 24.1 is mounted on a supporting arm 90.1. The pushing roller 24.2 is mounted on a supporting arm 90.2. The supporting arms 90.1, 90.2 operate as spokes of the left supporting disk 23. The pushing rollers 24.1, 24.2 are in addition mounted on two further corresponding supporting arms (not shown) which serve as spokes of the right supporting disk.

In the embodiment the two pushing rollers can rotate around their own rotating axes (perpendicular to the drawing plain of the figures) but cannot amend their position with respect to the supporting disks 23. Therefore the pushing rollers 24.1, 24.2 remain in their positions with respect to the circumferential surfaces of the supporting disks 23 during the entire operation.

The two supporting disks 23 and the two pushing rollers 24.1, 24.2 on the two supporting arms 90.1, 90.2 form the bale pushing device of the embodiment.

In the situation shown in FIG. 3 the first tailgate lever arm 12 and therefore the tailgate 11 are in the position as close as possible to the disk rotating axis 25.

The left supporting disk 23 is rigidly connected with the right supporting disk by means of the two pushing rollers 24.1, 24.2. Before being pushed onto the tailgate bottom 18 the bale is situated between these two supporting disks. The two supporting disks can be rotated around a joint disk rotating axis 25 in a rotating direction 100. The supporting disks are mounted centred on the joint rotating axis 25. Rotating the supporting disks in the rotating direction 100 causes that pushing roller 24.1 or 24.2 which is before the bale—seen in the travelling direction—to push the bale backwards and towards the tailgate frame 17.

In one embodiment a stationary retarding device 35 prevents the supporting disks 23 from rotating in a direction opposite to the rotating direction 100. In one embodiment a stop element mounted at a supporting disk 23 is stopped by the retarding device 35 if the supporting disks 23 are rotated in the opposite direction. The retarding device 35 does not inhibit the rotation of the supporting disks 23 in the rotating direction 100.

In one embodiment a so-called flipper element 50 is urged by a spring towards the left supporting disk 23. A similar flipper element is urged by a further spring against the right supporting disk. These flipper elements inhibit the supporting disks from rotating in a direction opposite to the rotating direction 100. When being rotated in the rotating direction 100 by the means 30, 31 (see below), the support disks pivot the flipper elements against the force of these springs away from the supporting disks.

The supporting disks 23 are rotated in an indexing manner, e.g. in a start-stop operation. Around their circumferential surface the supporting disks 23 are provided with several coupling pins 34.1, 34.2, 34.3. An actuator arm 30 can rotate around the disk rotating axis 25 within a circle segment which is limited by the actuating cylinder 31 (see below). At its free end this actuator arm 30 carries a coupling device 32. This coupling device 32 comprises a disk engaging hook 33 which is pivotally connected with the actuator arm 30 and a disk locking cylinder 83.

The disk locking cylinder 83 can pivot this disk engaging hook 33 around a pivoting axis 84 into an engaging position and into a releasing position. In the engaging position the disk engaging hook 33 engages one coupling pin 34.1, 34.2, 34.3 per time. Rotating the actuator arm 30 around the disk rotating axis 25 causes the supporting disks 23 to be rotated around this disk rotating axis 25 provided the disk engaging hook 33 is in an engaging position. When the disk engaging hook 33 is pivoted into the releasing position, the actuator arm 30 is not connected with the supporting disks 23. The flipper elements 50 prevent the supporting disks 23 from rotating. The supporting disks 23 remain in their current position.

As mentioned above, the two connected supporting disks 23 can be rotated into the rotating direction 100. The left supporting disk 23 is connected with the actuator arm 30 via the coupling device 32. This coupling device 32 comprises the disk engaging hook 33 and the disk locking cylinder 83. The disk engaging hook 33 can be pivoted into an engaging position in which the disk engaging hook 33 engages a coupling pin 34.1 as shown in FIG. 3 or a further coupling pin 34.2, 34.3.

This embodiment for rotating the supporting disks 23 saves the need of rotating a shaft and saves and avoids a large torque effectuated on this shaft.

An actuating cylinder 31 is at its left side pivotally connected with the frame 2 in a stationary pivoting axis 95. At its right side the actuating cylinder 31 is pivotally connected with the actuator arm 30 in a pivoting axis 96. This actuating cylinder 31 is double-acting. FIG. 3 shows the actuating cylinder in an expanded position, i.e. the piston rod is shifted out of the cylinder housing as far as possible. If the actuating cylinder 31 decreases its length, i.e. pulls the piston rod into the cylinder housing, the pivoting axis 96 is moved towards the stationary pivoting axis 95. This causes the actuator arm 30 to rotate around the stationary disk rotating axis 25 in the rotating direction 100. As the actuator arm 30 is connected with the supporting disk 23 via the coupling device 32, the supporting disk 23 is also rotated in the rotating direction 100. In the embodiment the actuating cylinder 31 and the disk locking cylinder 83 are implemented as hydraulic cylinders. Alternative actuating means are possible.

If the supporting disk 23 has reached a desired rotational position, the disk locking cylinder 83 pivots the disk engaging hook 33 around the pivoting axis 84 into a releasing position. The supporting disk 23 is no longer connected with the actuator arm 30. The flipper elements 50 prevent the supporting disks 23 from rotating. The actuator cylinder 31 expands again and rotates the actuator arm 30 in a direction opposite to the rotating direction 100. Afterwards the locking cylinder 83 pivots the disk engaging hook 33 again into an engaging position such that the coupling device 32 engages a further coupling pin 34.2.

The right supporting disk is connected with an actuator arm in a similar way. This right actuator arm is rotated by a further actuating cylinder. The two actuating cylinders 30 are operated in a synchronised manner.

In the embodiment a wrapping device 20 is mounted at the tailgate frame 17. Seen in the travelling direction this wrapping device 20 forms the rearmost part of the baler. This wrapping device 20 comprises a reel 88 for wrapping material (net or foil, e.g.). Wrapping material is picked off from the reel 88 and is guided by a wrapping material guiding member 98 and around a roller 99. An electrical horizontal cylinder 97 pivots the wrapping material guiding member 98.

The pressing belts are further guided around the tailgate bottom roller 19, a roller 74.2 mounted at the actuator arm 30, a roller 74.2 at one end of the first tailgate lever arm 12 and temporally around a pivotal guiding roller 82.1 or a pivoting guiding roller 28.2. The guiding roller 28.1 is mounted on a pivotal swing arm 26.1. The guiding roller 28.2 is mounted on a further pivotal swing arm 26.2. In the situation shown in FIG. 3 the two swing arms 26.1, 26.2 are connected with the supporting disk 23.

The left supporting disk 23 pivotally supports the two swing arms 26.1, 26.2 for two pivotal guiding rollers 28.1, 28.2. The corresponding right supporting disk pivotally supports two corresponding further swing arms. The pivotal guiding roller 28.1 is supported by a pair of two swing arms (left swing arm, right swing arm) which are pivotally mounted on one arm pivoting axis 27.1. The position shown in FIG. 4 to FIG. 14 is called the "guiding position" as the pivotal guiding rollers 28.1 and 28.2 guide the belt(s) 10 when being in the guiding position. FIG. 3 to FIG. 5 and FIG. 15 show the pivotal guiding roller 28.1 in a parking position in which the pivotal guiding roller 28.1 does not guide—or at least does not stretch and does not tension—the belt(s) 10.

The pivotal guiding roller 28.2 is supported by a further pair of two swing arms which are pivotally mounted on one arm pivoting axis 27.2. The radially extending free ends of the two swing arms of such a pair carry the connected pivotal guiding roller 28.1 or 28.2 between them. A bale B in the bale forming chamber is situated between two swing arms of such a pair. As the bale forming apparatus 1 comprises two pivotal guiding rollers 28.1, 28.2, there are four swing arms (two pairs each with two swing arms). The pivotal guiding roller 28.1 or 28.2 connects the two swing arms of a pair. FIG. 2 to FIG. 4 show one swing arm 26.1.

These pivotal guiding rollers 28.1, 28.2 serve as the pivotal guiding members in the sense of the claims. The swing arms 26.1, 26.2 operate as the guiding member arms.

A hydraulic horizontal swing arm hook cylinder 42 can rotate the swing arm pivoting hook 41 around the stationary pivoting axis 45. This swing arm hook cylinder 42 is pivotally connected with the swing arm pivoting hook 41 in a pivoting axis 79 and with the frame 2 in a stationary pivoting axis 38.

A catching and locking hook 46 mounted at the swing arm pivoting hook 41. For pivoting the swing arm 26.1 in a direction opposite to the rotating direction 100 the catching and locking hook 46 can engage a coupling pin 40.1 mounted on the swing arm 26.1.

The swing arm pivoting hook 41 has an arcuate edge 44 facing towards the disk rotating axis 25. A shifting pin 39.1 mounted on the swing arm 26.1 between the pivoting axis 27.1 and the coupling pin 40.1. For pivoting the swing arm 26.1 in the rotating direction 100 the arcuate edge 44 can shift the shifting pin 39.1 which causes the swing arm 26.1 to be pivoted in the rotating direction 100.

FIG. 3 shows the tailgate bottom 18 in a raised position such that the tailgate bottom roller 19 has a minimal distance to the supporting disk 23. At the free end of the tailgate bottom 18 the tailgate bottom roller 19 guiding the pressing belts 10 is mounted. FIG. 4 shows the tailgate bottom 18 in a lowered position. The distance between the tailgate bottom roller 19 and the supporting disk 23 is increased. The tailgate bottom cylinder 80 is expanded and has pivoted the tailgate bottom 18 around the pivoting axis 22. The other parts remain in the position of FIG. 3.

In FIG. 5 the actuating cylinder 31 has been retracted, i.e. the piston rod is moved into the cylinder housing. The pivoting axis 96 is moved towards the stationary pivoting axis 95. As the actuating cylinder 31 is connected with the actuator arm 30 and the actuator arm 30 is coupled with the supporting disk 23 via the coupling device 32, the supporting disk 23 is rotated around the disk rotating axis 25 into the rotating direction 100. The pushing rollers 24.1, 24.2 and the guiding rollers 28.1, 28.2 are also rotated in the rotating direction 100. As the tailgate bottom 18 has been pivoted downwards, the pushing roller 24.1 does not hit the tailgate bottom roller 19.

The pushing roller 24.1 pushes the bale B away from the outlet 7 and onto the tailgate bottom 18. This causes the tailgate frame 17 to be pivoted away from the outlet 7, as can be seen from a comparison of FIG. 5 with FIG. 6. The first tailgate lever arm 12 is pivoted around the pivoting axis 93, cf. FIG. 4, FIG. 5, and FIG. 6. Preferably this pivotal movement is performed by the bale B as well as by an expansion of the horizontal tailgate cylinder 15. This expansion is synchronised with the rotation of the supporting disks 23 and causes the pivoting axis 76 to be moved away from the stationary pivoting axis 89. The lever arrangement with the first tailgate lever 12, the second tailgate lever 13 and the third tailgate lever arm 21 causes the tailgate frame 17 to be pivoted away from the supporting disk 23. The tailgate bottom 18 carrying the bale is also pivoted away from the supporting disks 23.

Now the tailgate frame 17 is further pivoted, this time with respect to the first tailgate lever arm 12. For this pivotal movement the vertical tailgate cylinder 14 is expanded. This expansion causes the pivoting axis 73 to be shifted away from the stationary pivoting axis 92. The second tailgate lever arm 13 and the third tailgate lever arm 21 are shifted and further pivot the tailgate frame 17. The new situation is shown in FIG. 7. The first tailgate lever arm 12 and the horizontal tailgate cylinder 15 remain in their positions.

Preferably the wrapping of the bale B on the tailgate 11 starts between the situation shown in FIG. 6 and the situation shown in FIG. 7 or starts in the situation shown in FIG. 7. The wrapping material is pulled from the reel 88 and is guided around the guiding roller 99 and is inserted into the space between the bale and the tailgate frame 17. The bale B is still rotated in the rotating direction 100 by the pressing bales. The rotating bale grasps the wrapping material and pulls further wrapping material from the reel 88. In the situation shown in FIG. 6 and FIG. 7 the tailgate 11 is in the bale supporting position.

FIG. 8 shows the continuation of this pivotal movement. The vertical tailgate cylinder 14 is further expended and further pivots the second tailgate lever arm 13 and the third tailgate lever arm 21. In FIG. 9 the new position of the tailgate frame 17 after being pivoted around the full pivoting angle is shown. This pivotal movement is in the embodiment performed by expanding the vertical tailgate cylinder 14. The tailgate is now in the bale ejecting position. The tensioning arm 60 is also pivoted with respect to the first tailgate lever arm 12, namely around the pivoting axis 70. The supporting disk 23 is kept in its position by the flipping elements 50. The pushing roller 24 prevents the bale from rolling down from the tailgate bottom 18 towards the outlet 7. In the position of FIG. 9 the force of gravity makes the bale B dropping downwards. By this step the bale B is ejected from the bale forming apparatus 1.

The pivoted tensioning arm 60 with the guiding roller 74.1 ensures a sufficient tensioning of the pressing bales 10.

After the tailgate 11 has reached the position of FIG. 9 and the bale is ejected, the coupling device 32 is released. The disk locking cylinder 83 pivots the disk engaging hook 33 into the releasing position. The actuating cylinder 31 is expanded and pivots the actuator arm 30 in a direction opposite to the rotating direction 100. Afterwards the disk locking cylinder 83 pivots the disk engaging hook 33 again into an engaging position. The supporting disk 23 remains in the old position. This time the disk engaging hook 33 engages the coupling pin 34.2. FIG. 10 shows the new situation.

The next step is to pivot the tailgate frame 17 and the tailgate bottom 18 back into the bale receiving position such that a new bale can be pushed onto the tailgate bottom 18. For this purpose the vertical tailgate cylinder 14 is retracted again such that the pivoting axis 73 is moved towards the stationary pivoting axis 92. This step and its own weight cause the tailgate frame 17 to be pivoted back, i.e. anti-clockwise. FIG. 11 shows an intermediate position of the tailgate 11 while being pivoted back. The first tailgate lever arm 12 and the horizontal tailgate cylinder 15 remain in their positions shown in FIG. 10.

The pivotal movement of the tailgate frame 17 is continued. The tensioning arm 60 is pivotally coupled with the first tailgate lever arm 12 in the pivoting axis 70 and with the tensioning lever arm 61 in the pivoting axis 77. The tensioning lever arm 61 is pivotally connected with the second tailgate lever arm 13 in the pivoting axis 87. The second tailgate lever arm 13 is pivotally connected with the first tailgate lever arm 12 in the pivoting axis 72. The second kinematic parallelogram structure with the four pivoting axes 70, 77, 72, 87 urges the tensioning arm 60 to be pivoted away from the supporting disks 23. As the tensioning arm 60 carries the guiding roller 74.1, the pressing belts 10 are tensioned. FIG. 12 shows this situation with the tensioning arm 60 pivoted away from the supporting disks 23.

The tailgate frame 17 is further pivoted towards the supporting disk 23. The horizontal tailgate cylinder 15 is retracted and pulls the pivoting axis 76 towards the stationary pivoting axis 89. This causes the first tailgate lever arm 12 to be pivoted around the stationary pivoting axis 93. By this the tailgate frame 17 is pivoted. The connected tailgate bottom 18 is pivoted towards the supporting disks 23. FIG. 13 and FIG. 14 show the continuation of the pivotal movement.

Finally the situation of FIG. 15 is achieved. A new bale can be pushed onto the tailgate bottom 18. While this new bale is formed, the tailgate bottom 18 is in the raised position as shown in FIG. 3 and the tailgate bottom roller 19 guides the pressing belts 10 as required.

It is also possible to perform the steps of rotating the supporting disks 23 and of pivoting the tailgate 11 into the bale receiving position timely overlapping with each other or first to pivot the tailgate 11 and afterwards rotating the supporting disks 23.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

REFERENCE SIGNS

| Sign | Description |
|---|---|
| B | first bale |
| B' | second bale |
| GS | ground surface |
| TD | travelling direction of the bale forming apparatus 1 |
| 1 | bale forming apparatus |
| 2 | frame, comprises the front housing part |
| 3 | wheels |
| 4 | front end with towing unit |
| 5 | intake device, comprises inlet 6 and outlet 7 |
| 6 | inlet of intake device 5 |
| 7 | outlet of intake device 5 |
| 8 | stationary supporting rollers |
| 9 | bale forming device, comprises endless belt(s) 10 |
| 10 | endless belt(s), operate as the bale forming means |
| 11 | pivotal tailgate, serves as rear housing part, comprises tailgate frame 17 and pivotal tailgate bottom 18 |
| 12 | first tailgate lever arm for pivoting the tailgate frame 17 |
| 13 | second tailgate lever arm for pivoting the tailgate frame 17 |
| 14 | vertical hydraulic tailgate cylinder, connected with the second tailgate lever arm 13 and the third tailgate lever arm 21 in the pivoting axis 73 |
| 15 | horizontal hydraulic tailgate cylinder, connected with the first tailgate lever arm 12 in the pivoting axis 76 |
| 16 | pivoting axis between tailgate frame 17 and first tailgate lever arm 12 |
| 17 | tailgate frame with parts 17.1, 17.2, 17.3, 17.4 |
| 17.1, 17.2, 17.3, 17.4 | tailgate frame parts, are rigidly connected with each other |
| 18 | pivotal tailgate bottom |
| 19 | tailgate bottom roller, mounted at tailgate bottom 18 |
| 20 | wrapping device |
| 21 | third tailgate lever arm for pivoting the tailgate frame 17 |
| 22 | pivoting axis between tailgate bottom 18 and tailgate frame 17 |
| 23 | (left) supporting disk |
| 24.1, 24.2 | pushing rollers, mounted at supporting disk 23 |
| 25 | disk rotating axis of supporting disk 23 |
| 26.1, 26.2 | swing arms for pivotal guiding members 28.1, 28.2 |
| 27.1, 27.2 | swing arm pivoting axes for swing arms 26.1, 26.2 |
| 28.1, 28.2 | pivotal guiding rollers, mounted on swing arms 26.1, 26.2 |
| 30 | actuator arm, rotates supporting disk 23 |
| 31 | actuating cylinder for moving the actuator arm 30, pivotally connected with the actuator arm 30 in pivoting axis 96 |
| 32 | coupling device, comprises the disk engaging hook 33 and the disk locking cylinder 83 |
| 33 | disk engaging hook of the coupling device, can engage one coupling pin 34.1, 34.2, 34.3 |
| 34.1, 34.2, 34.3 | coupling pins mounted at supporting disk 23 which can be coupled with actuator arm 30 via coupling device 32 |
| 35 | retarding device for the supporting disks 23 |
| 36 | fixed guiding element above the front supporting roller 8 |
| 37 | bale release control device |
| 38 | stationary pivoting axis of the swing arm pivoting hook cylinder 42 |
| 39.1 | shifting pin, mounted on the swing arm 26.1 between the pivoting axis 27.1 and the coupling pin 40.1 |
| 40.1 | coupling pin, mounted on swing arm 26.1 for the pivotal guiding roller 28.1 |
| 40.2 | coupling pin, mounted on swing arm 26.2 for the pivotal guiding roller 28.2 |
| 41 | swing arm pivoting hook for the swing arm 26.1 |

-continued

| | |
|---|---|
| 42 | swing arm hook cylinder, moves swing arm pivoting hook 41 |
| 44 | arcuate guiding edge of the swing arm pivoting hook 41 |
| 45 | stationary pivoting axis of swing arm pivoting hook 41 |
| 46 | catching and locking hook at the swing arm pivoting hook 41, engages the coupling pin 40.1 |
| 50 | flipper element, prevents supporting disk 23 from rotating opposite to rotating direction 100 |
| 60 | pivotal tensioning arm for tensioning the pressing belts 10 |
| 61 | tensioning lever, connects tensioning arm 60 with second tailgate lever arm 13 |
| 70 | pivoting axis between tensioning arm 60 and first tailgate lever arm 12 |
| 72 | pivoting axis between second lever arm 13 and first tailgate lever arm 12 |
| 73 | pivoting axis between third tailgate lever arm 21 and second tailgate lever arm 13 |
| 74.1, 74.2 | pivoting axes of rollers for pressing belts 10 |
| 75 | pivoting axis between third tailgate lever arm 21 and tailgate frame 17 |
| 76 | pivoting axis between third tailgate lever arm 12 and horizontal tailgate cylinder 15 |
| 77 | pivoting axis between tensioning arm 60 and tensioning lever 61 |
| 78 | pivoting axis between first tailgate lever arm 12 and horizontal tailgate cylinder 15 |
| 79 | pivoting axis between swing arm pivoting hook 41 and swing arm hook cylinder 42 |
| 80 | tailgate bottom cylinder, pivots tailgate bottom 18 |
| 83 | disk locking cylinder for moving the coupling device 32 |
| 84 | pivoting axis of coupling device 32 |
| 86 | stationary pivoting axis of third tailgate lever arm 21 |
| 87 | pivoting axis between tensioning lever 61 and second tailgate lever arm 13 |
| 88 | reel with wrapping material, belongs to wrapping device 20 |
| 89 | stationary pivoting axis of horizontal tailgate cylinder 15 |
| 90.1, 90.2 | supporting arms for the pushing rollers 24.1, 24.2, operate as spokes of the left supporting disk 23 |
| 91 | pivoting axis between tailgate bottom cylinder 80 and tailgate frame 17 |
| 92 | stationary pivoting axis of vertical tailgate cylinder 14 |
| 93 | pivoting axis between tailgate bottom cylinder 80 and tailgate bottom 18 |
| 95 | stationary pivoting axis of actuating cylinder 31 |
| 96 | pivoting axis between the actuating cylinder 31 and the actuator arm 30 |
| 97 | electrical cylinder for pivoting the wrapping material guiding member 98 |
| 98 | wrapping material guiding member |
| 99 | guiding roller for guiding wrapping material |
| 100 | disk rotating direction |

The invention claimed is:

1. A bale forming apparatus for forming cylindrical bales of material, the bale forming apparatus comprising:
an intake device with an outlet;
a bale forming device;
a front housing part;
a pivotally mounted rear housing part;
a pivoting mechanism for pivoting the rear housing part; and
a bale pushing device,
wherein the rear housing part comprises a bale carrying member and a rear wall part,
wherein the bale forming device comprises a bale forming mechanism adapted for surrounding a bale forming chamber adjacent to the outlet,
wherein the front housing part and the rear housing part are arranged for being connected with each other for forming a housing surrounding the bale forming mechanism and for being released from each other,
wherein the intake device is adapted for conveying material through the outlet into the bale forming chamber,
wherein the bale forming device is adapted for forming a cylindrical bale in the bale forming chamber by means of the bale forming mechanism,
wherein the rear housing part is adapted for carrying a bale on the bale carrying member where this bale has been formed in the bale carrying chamber,
wherein the pivoting mechanism is adapted for pivoting the rear housing part into a bale receiving position and from the bale receiving position into a bale ejecting position,
wherein the bale pushing device is adapted for pushing a bale formed in the bale forming chamber away from the outlet onto the bale carrying member while the rear housing part is in the bale receiving position,
wherein the pivoting mechanism is adapted for pivoting the rear housing part with respect to the front housing part together with a bale on the bale carrying member from the bale receiving position away from the outlet around an angle of at least 90 degrees into the bale ejecting position, and
wherein the rear housing part is further adapted for ejecting a bale, which is on the bale carrying member, when the rear housing part is in the bale ejecting position.

2. The bale forming apparatus according to claim 1, wherein the bale carrying member is pivotally connected with the rear wall part, the pivoting mechanism comprises a carving member a pivoting actuator, and the carrying member pivoting actuator is adapted for pivoting the carrying member downwards when the bale pushing device pushes a bale onto the bale carrying member.

3. The bale forming apparatus according to claim 1, wherein the pivoting mechanism is adapted for pivoting the rear housing part with respect to the front housing part the together with a bale on the bale carrying member from the bale receiving position around an angle of more than 90 degrees away from the outlet into the bale ejecting position.

4. The bale forming apparatus according to claim 1, wherein the rear housing part is connected with the front housing part by means of a lever mechanism, the pivoting mechanism is connected with the lever mechanism and is adapted for moving the lever mechanism, the lever mechanism is mechanically connected with the rear housing part in at least two distinct connection areas such that two spaced-apart pivoting axes for a pivotal connection between the rear housing part and the lever mechanism occur, and such that moving the lever mechanism causes the rear housing part to be pivoted with respect to the front housing part.

5. The bale forming apparatus according to claim 4, wherein the lever mechanism comprises a first lever arm and a second lever arm, the first lever arm is connected with the rear housing part in a first pivoting axis, the second lever arm is connected with the rear housing part in a second pivoting axis, these two pivoting axes form the two spaced-apart pivoting axes, and both lever arms are connected with the pivoting mechanism.

6. The bale forming apparatus according to claim 1, wherein the bale forming mechanism is guided around a guiding member, the guiding member is mounted at a free end of a tensioning arm, and the tensioning arm is pivotally connected with the lever mechanism.

7. The bale forming apparatus according to claim 1, wherein the rear housing part is connected with the front housing part by means of a lever arrangement, the lever arrangement is connected with the front housing pan and with the rear housing part, at least one of these two connections is a pivotal connection, and the bale forming apparatus is adapted for pushing the rear housing part away from the front housing part when pushing a bale onto the bale carrying member.

8. The bale forming apparatus according to claim 1, wherein the bale forming apparatus further comprises a bale size sensor, the bale size sensor is adapted for measuring the diameter of a bale on the bale carrying member or of a bale in the bale forming chamber, and the pivoting mechanism is adapted for pivoting the rear housing part with respect to the front housing part around pivoting angle which angle depends on the measured bale diameter.

9. The bale forming apparatus according to claim 1, wherein the bale forming apparatus comprises several guiding members, the bale forming mechanism is guided around these guiding members, at least one guiding member is mounted at the bale carrying member, at least one further guiding member is mounted at the rear wall part, and at least one further guiding member is mounted at the front housing part.

10. The bale forming apparatus according to claim 9, wherein the bale carrying member is connected with the rear wall part in a connecting edge, and at least one guiding member for guiding the bale forming mechanism is mounted near the free edge of the bale carrying member where the free edge is the edge opposite the connected edge.

11. The bale forming apparatus according to claim 1, wherein the bale pushing device comprises:
a holding device;
a pushing element mechanically connected with the holding device and
a drive for the holding device,
wherein the holding device is mounted such that it can be rotated around a rotating axis,
the drive is adapted for rotating the holding device together with the connected pushing element around the rotating axis in a rotating direction, and
rotating the holding device in the rotating direction causes the connected pushing element to push a bale away from the outlet onto the bale carrying member of the rear housing part being in the bale receiving position.

12. The bale forming apparatus according to claim 1, wherein the pivoting mechanism is adapted for pivoting the rear housing part carrying a bale from the bale receiving position into a bale supporting position and from the bale supporting position around a pivoting angle of more than 90 degrees into the bale ejecting position such that pivoting the rear housing part from the bale receiving position into the bale supporting position increases the distance between the bale on the bale carrying member and the outlet.

13. The bale forming apparatus according to claim 12, wherein the pivoting mechanism is adapted for pivoting the rear housing part from the bale receiving position into the bale supporting position by pivoting the bale carrying member carrying a bale while the rear wall part is still connected with the front housing part.

14. A bale forming method for forming cylindrical bales of material, the method comprising the steps of:
conveying material with an intake device through an outlet into a bale forming chamber formed adjacent to the outlet of the intake device;
funning with a bale forming device a cylindrical bale in the bale forming chamber by means of a bale forming mechanism surrounding the bale forming chamber;
forming the bale from material which is conveyed into the bale forming chamber;
surrounding the bale forming means by a housing formed by a front housing part and a rear housing part connected with the front housing part;
pushing the bale with a bale pushing device away from the outlet onto a bale carrying member belonging to the rear housing part, wherein pushing the bale is performed while the rear housing part is in a bale receiving position and while the rear housing part is still connected with the front housing part;
releasing the rear housing part from the front housing part;
pivoting the rear housing part together with a bale on the bale carrying member respect to the front housing part from the bale receiving position and away from the outlet around an angle of at least 90 degrees into a bale ejecting position; and
pivoting the rear housing part into the bale ejecting position to eject the bale carried by the bale carrying member.

15. The bale forming method according to claim 14, wherein the rear housing part is first pivoted from the bale receiving position into a bale supporting position while still being connected with the front housing part, pivoting the rear housing part into the bale supporting position increases the distance between a bale on the bale carrying member and the outlet, and the rear housing part is afterwards pivoted from the bale supporting position into the bale ejecting position.

* * * * *